(12) United States Patent
Moon et al.

(10) Patent No.: US 10,965,143 B2
(45) Date of Patent: Mar. 30, 2021

(54) WIRELESS POWER TRANSMISSION DEVICE AND OPERATION METHOD OF WIRELESS POWER TRANSMISSION DEVICE

(71) Applicant: SAMSUNG ELECTRONICS CO., LTD., Suwon-si (KR)

(72) Inventors: Ji-bum Moon, Seoul (KR); Jung-geun Kim, Suwon-si (KR); Hark-joon Kim, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 16/074,917

(22) PCT Filed: Dec. 29, 2016

(86) PCT No.: PCT/KR2016/015483
§ 371 (c)(1),
(2) Date: Aug. 2, 2018

(87) PCT Pub. No.: WO2017/155195
PCT Pub. Date: Sep. 14, 2017

(65) Prior Publication Data
US 2019/0044366 A1   Feb. 7, 2019

(30) Foreign Application Priority Data

Mar. 10, 2016   (KR) .................. 10-2016-0029107

(51) Int. Cl.
*H01M 10/44* (2006.01)
*H01M 10/46* (2006.01)
(Continued)

(52) U.S. Cl.
CPC ................ *H02J 7/025* (2013.01); *G06F 1/16* (2013.01); *G06F 3/0482* (2013.01);
(Continued)

(58) Field of Classification Search
CPC .. H02J 7/025; H02J 7/027; H02J 50/90; H02J 50/10; H02J 7/00034; H02J 50/20;
(Continued)

(56) References Cited

U.S. PATENT DOCUMENTS 9,793,738 B2    10/2017  Jacobs et al.
10,228,810 B2 *  3/2019  Shin .................. H04N 21/4758
(Continued)

FOREIGN PATENT DOCUMENTS

EP    2 579 522    4/2013
EP    2 763 422    8/2014
(Continued)

OTHER PUBLICATIONS

Extended Search Report dated Dec. 13, 2018 in counterpart European Patent Application No. 16893709.2.
(Continued)

*Primary Examiner* — Edward Tso
(74) *Attorney, Agent, or Firm* — Nixon & Vanderhye, P.C.

(57) ABSTRACT

Provided are a wireless power transmission device and an operation method of the wireless power transmission device according to embodiments. The wireless power transmission device according to an embodiment includes: a wireless power transmitter configured to transmit wireless power to a mobile device in response to a signal indicating that the mobile device is in contact with the wireless power transmission device; and a controller configured to control an operation with the mobile device, control an electronic device connected to the wireless power transmission device, or control at least one external device, in response to the signal indicating that the mobile device is in contact with the wireless power transmission device.

19 Claims, 30 Drawing Sheets

(51) Int. Cl.
*H02J 7/02* (2016.01)
*H02J 50/10* (2016.01)
*H02J 50/90* (2016.01)
*H04N 21/61* (2011.01)
*H04N 21/6408* (2011.01)
*G06F 1/16* (2006.01)
*H04M 1/725* (2021.01)
*G06F 3/0482* (2013.01)
*H02J 7/00* (2006.01)

(52) U.S. Cl.
CPC ............ *H02J 7/0027* (2013.01); *H02J 50/10* (2016.02); *H02J 50/90* (2016.02); *H04M 1/7253* (2013.01); *H04M 1/72533* (2013.01); *H04N 21/61* (2013.01); *H04N 21/6408* (2013.01); *H02J 7/00034* (2020.01)

(58) Field of Classification Search
CPC .......... H02J 50/40; H02J 50/50; H04N 21/61; H04N 21/6408; H04M 1/7253; H04M 1/72533; G06F 16/1734; G06F 16/24578
USPC ......... 320/108, 114, 115, 116; 707/628, 728; 307/104
See application file for complete search history.

(56) References Cited

U.S. PATENT DOCUMENTS

| | | | | |
|---|---|---|---|---|
| 2008/0007654 | A1* | 1/2008 | Ryu .................... | H04N 5/44591 348/564 |
| 2011/0140538 | A1* | 6/2011 | Jung .................... | H02J 50/12 307/104 |
| 2012/0115549 | A1* | 5/2012 | Kim .................... | H02J 7/025 455/566 |
| 2012/0294463 | A1* | 11/2012 | Chu .................... | H04M 1/6041 381/150 |
| 2012/0303939 | A1 | 11/2012 | Cain et al. | |
| 2013/0007202 | A1* | 1/2013 | Lee .................... | G06F 1/1626 709/217 |
| 2013/0030892 | A1* | 1/2013 | Liu .................... | G06Q 20/322 705/14.16 |
| 2015/0046526 | A1* | 2/2015 | Bush .................... | H04B 5/0075 709/204 |
| 2015/0249484 | A1* | 9/2015 | Mach .................... | H02J 50/10 307/104 |
| 2016/0126776 | A1* | 5/2016 | Kim .................... | H04W 4/80 320/108 |

FOREIGN PATENT DOCUMENTS

| | | |
|---|---|---|
| JP | 2013-085248 | 5/2013 |
| KR | 10-2012-0103329 | 9/2012 |
| KR | 10-2013-0004821 | 1/2013 |
| KR | 10-1377301 | 4/2014 |
| KR | 10-1409719 | 6/2014 |
| KR | 10-2014-0134901 | 11/2014 |
| KR | 10-2015-0146323 | 12/2015 |
| WO | 2015/017274 | 2/2015 |

OTHER PUBLICATIONS

CES 2015—Canon USA Connect Station CS100—The Social Media Show_ https://youtu.be/jvufH4VH9EM.
2015 Samsung UHD Evolution Kit (SEK-3500)—Installing [How To]_ https://www.youtube.com/watch?v=gjDay3zt0_g.
Samsung's SmartThings next-gen hub does more _https://youtu.be/JhfAo7NNuFk.
Samsung QLED One Connect Box—How to connect your gaming consoles_https://www.youtube.com/watch?v=dJyqw3O8o6Q.
Search Report dated Mar. 21, 2017 in counterpart International Patent Application No. PCT/KR2016/015483 and English-language translation.
Written Opinion dated Mar. 21, 2017 in counterpart International Patent Application No. PCT/KR2016/015483 and English-language translation.
Summons to attend oral proceedings pursuant to Rule 115(1) EPC dated Jan. 19, 2021 in counterpart European Patent Application No. 16893709.2.

* cited by examiner

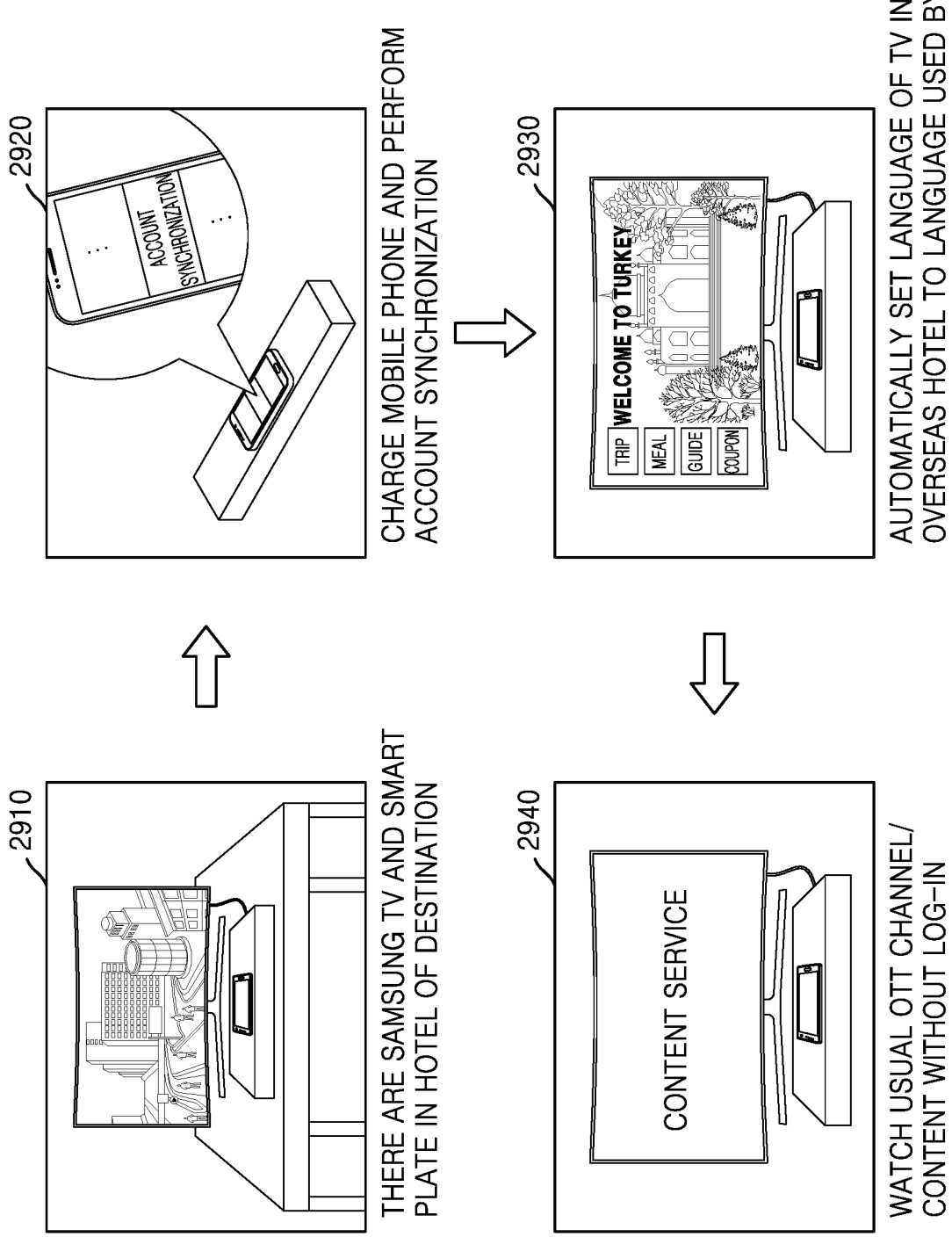

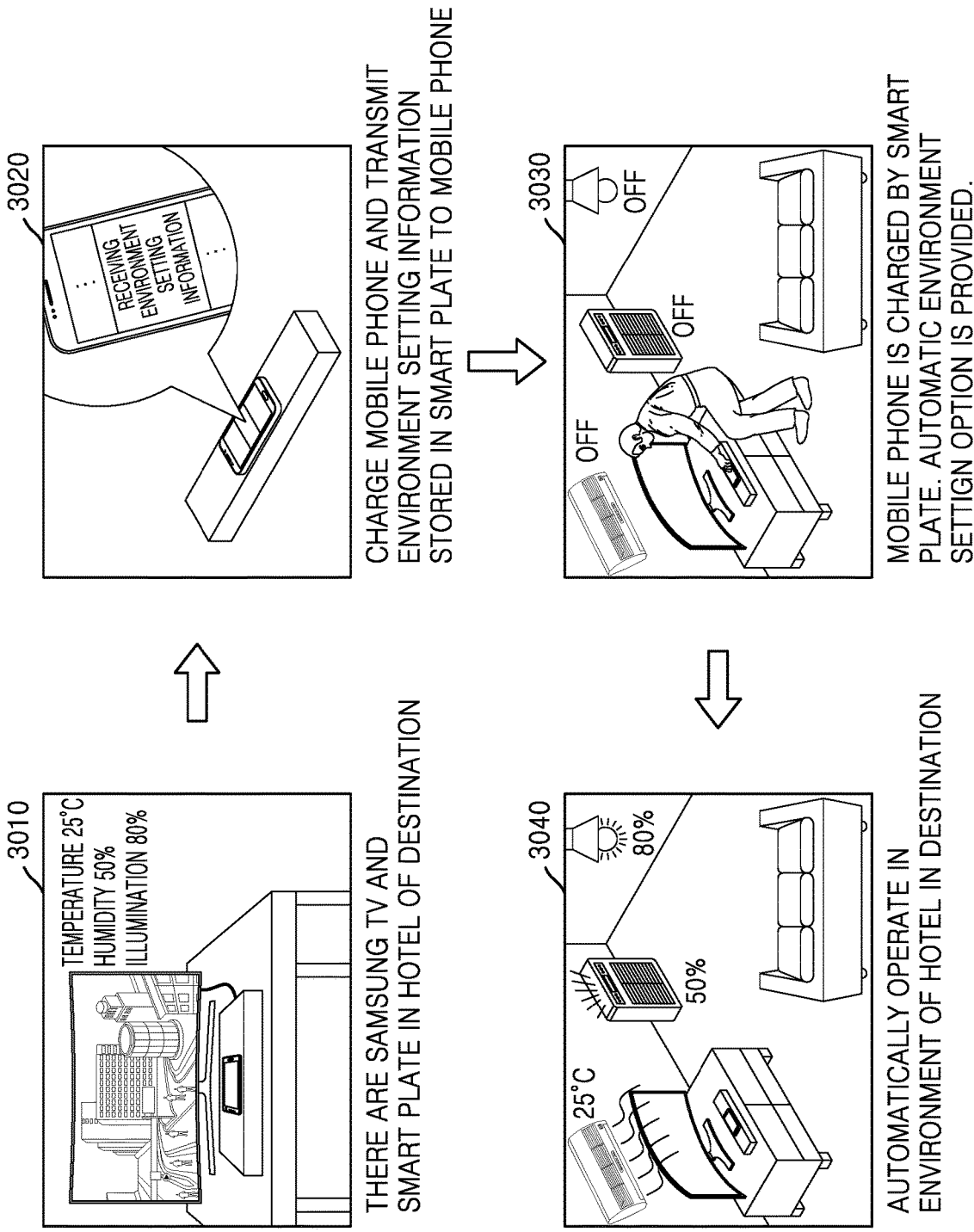

WIRELESS POWER TRANSMISSION DEVICE AND OPERATION METHOD OF WIRELESS POWER TRANSMISSION DEVICE

This application is the U.S. national phase of International Application No. PCT/KR2016/015483 filed Dec. 29, 2016, which designated the U.S. and claims priority to KR Patent Application No. 10-2016-0029107 filed Mar. 10, 2016, the entire contents of each of which are hereby incorporated by reference.

TECHNICAL FIELD

The present disclosure relates to a wireless power transmission device and an operation method of the wireless power transmission device.

BACKGROUND ART

As mobile devices such as smartphones and wearable devices have recently become pervasive, users may obtain various data in both indoor and outdoor environments. For example, a user may obtain still image content or video content by capturing an image or a video in an outdoor environment by using a camera of a smartphone. Also, a user may watch movie content, which was downloaded from the Internet or the like, by using a mobile device while moving in an outdoor environment.

A user may want to use content by using a device having better performance in an indoor environment, such as a television (TV), a personal computer (PC), or an audio device. Also, a user may want to synchronize with an indoor electronic device and store data, which was obtained by a mobile device in an indoor or outdoor environment, in the indoor electronic device. Since a user may easily accumulate image data by using a camera of a smartphone, the image data accumulated in the smartphone may be changed or added every day. It may be very inconvenient for the user to perform synchronization every time by transferring such added data to various indoor electronic devices.

Accordingly, there is a demand for technology capable of interoperating various data obtained in indoor and outdoor environments with an indoor electronic device and conveniently using the interoperated data.

SUMMARY

Objectives of various embodiments are to provide a wireless power transmission device and an operation method of the wireless power transmission device, which may interoperate various data obtained in indoor and outdoor environments by using a mobile device with an indoor electronic device and conveniently use the interoperated data.

To solve the technical problem, there are provided a wireless power transmission device and an operation method of the wireless power transmission device, the wireless power transmission device including: a wireless power transmitter configured to transmit wireless power to a mobile device in response to a signal indicating that the mobile device is in contact with the wireless power transmission device; and a controller configured to perform a control operation with respect to at least one of the mobile device, an electronic device connected to the wireless power transmission device, and an external device, in response to the signal indicating that the mobile device is in contact with the wireless power transmission device.

According to disclosed embodiments, users may interoperate various data obtained in indoor or outdoor environments by using mobile devices with indoor electronic devices and may conveniently use the interoperated data.

BRIEF DESCRIPTION OF THE DRAWINGS

FIG. 29 is a reference diagram for explaining a usage example of an account synchronization mode, according to an embodiment.

FIG. 30 is a reference diagram for explaining a usage example of an environment setting control mode, according to an embodiment.

DETAILED DESCRIPTION OF EXAMPLE EMBODIMENTS

Figure 1:
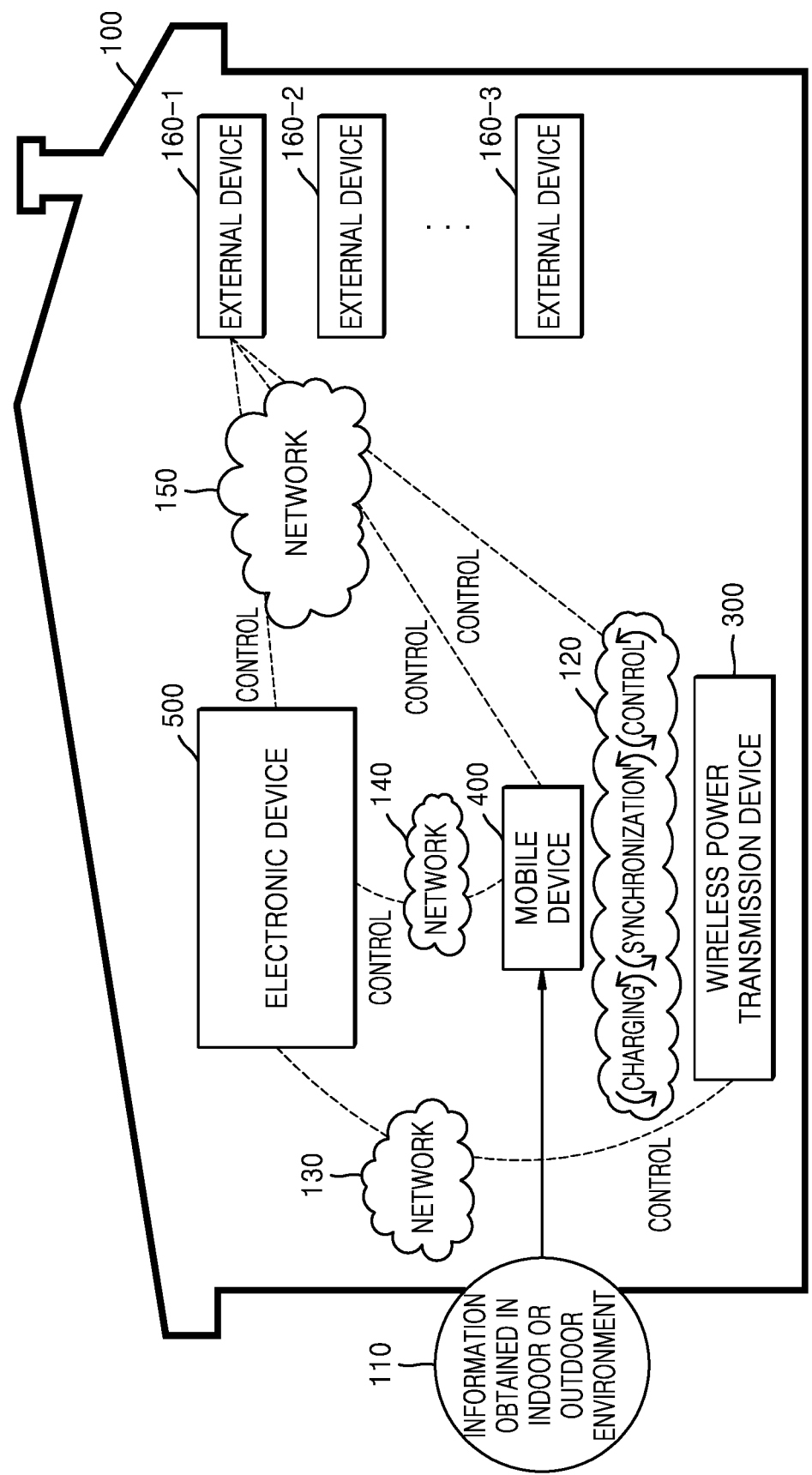
FIG. 1 is a schematic diagram for explaining a network environment to which disclosed embodiments are applied.

A wireless power transmission device according to an embodiment includes: a wireless power transmitter configured to transmit wireless power to a mobile device in response to a signal indicating that the mobile device is in contact with the wireless power transmission device; and a controller configured to perform a control operation with respect to at least one of the mobile device, an electronic device connected to the wireless power transmission device, and an external device in response to the signal indicating that the mobile device is in contact with the wireless power transmission device.

According to an embodiment, the controller may be further configured to obtain the signal indicating that the mobile device is in contact with the wireless power transmission device from a power control message or a near-field communication signal received from the mobile device.

According to an embodiment, the controller may be further configured to starts a data synchronization operation with the mobile device in response to the signal indicating that the mobile device is in contact with the wireless power transmission device.

According to an embodiment, data of the data synchronization operation may include account data or content data.

According to an embodiment, the controller may be further configured to: detect that the mobile device is reproducing content; and in response to a reproduction notification signal indicating that the mobile device is reproducing the content, received from a detector, automatically transmit a command to the electronic device to cause the content being reproduced by the mobile device to be reproduced by the electronic device connected to the wireless power transmission device.

According to an embodiment, the controller may be further configured to: receive setting data for controlling the electronic device or the at least one external device from the mobile device; and transmit a signal for controlling the electronic device or the at least one external device by using the received setting data to the electronic device or the at least one external device.

According to an embodiment, the electronic device may include a display device, and the at least one external device includes at least one home appliance installed in a home.

A wireless power transmission device according to another embodiment includes: a wireless power transmitter configured to transmit power to a mobile device in response to a signal indicating that the mobile device is in contact with the wireless power transmission device; and a controller configured to, in response to the signal indicating that the mobile device is in contact with the wireless power transmission device, transmit a command to output a user interface for selecting one or more functionalities to an electronic device connected to the mobile device or the wireless power transmission device.

According to an embodiment, the one or more functionalities may include at least one from among a function of controlling an operation with the mobile device, a function of controlling an operation with the electronic device connected to the wireless power transmission device, and a function of controlling an operation of at least one external device.

According to an embodiment, the one or more functionalities may include at least one from among a seamless content viewing function, an environment setting control function, a content synchronization function, and an account synchronization function.

According to an embodiment, the user interface may include: an activation inquiry user interface for inquiring about whether to activate a functionality menu user interface that provides a functionality menu; and the functionality menu user interface output in response to an input that selects activation from the activation inquiry user interface.

An operation method of a wireless power transmission device according to an embodiment includes: transmitting wireless power to a mobile device in response to a signal indicating that the mobile device is in contact with the wireless power transmission device; and performing a control operation with respect to at least one of the mobile device, an electronic device connected to the wireless power transmission device, and an external device in response to the signal indicating that the mobile device is in contact with the wireless power transmission device.

An operation method of a wireless power transmission device according to another embodiment includes: transmitting power to a mobile device in response to a signal indicating that the mobile device is in contact with the wireless power transmission device; and in response to the signal indicating that the mobile device is in contact with the wireless power transmission device, transmitting a command to output a user interface for selecting one or more functionalities to an electronic device connected to the mobile device or the wireless power transmission device.

Various embodiments of the present disclosure will now be described more fully in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed, but the present disclosure should be construed to cover all modifications, equivalents, and alternatives falling within the spirit and scope of the various embodiments of disclosure.

As used in various embodiments of the present disclosure, the expressions <include>, <may include>, and other conjugates refer to the existence of a corresponding function, operation, or constituent element, and do not limit one or more additional functions, operations, or constituent elements. Further, as used in various embodiments of the present disclosure, the terms <include>, <have>, and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present disclosure, the expression <or> includes any or all combinations of words enumerated together. For example, the expression <A or B> may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both of them are user devices. For example, a first constituent element may be referred to as a second constituent element, and likewise a second constituent element may also be referred to as a first constituent element without departing from the scope of various embodiments of the present disclosure.

When a component is referred to as being <connected> or <accessed> to or by any other component, it should be understood that the component may be directly connected or accessed by the other component, but another new component may also be interposed between them. Contrarily, when a component is referred to as being <directly connected> or <directly accessed> to or by any other component, it should be understood that there is no new component between the component and the other component.

The terms as used in various embodiments of the present disclosure are merely for the purpose of describing particular embodiments and are not intended to limit the various embodiments of the present disclosure. Singular forms are intended to include plural forms unless the context clearly indicates otherwise.

Unless defined otherwise, all terms used herein, including technical terms and scientific terms, have the same meaning as commonly understood by one of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

Devices according to various embodiments will now be described with reference to the accompanying drawings.

FIG. 1 is a schematic diagram for explaining a network environment 100 and a comprehensive concept to which disclosed embodiments are applied.

Referring to FIG. 1, the network environment 100 includes a wireless power transmission device 300, a mobile device 400, an electronic device 500, an external device 160, a network 120, a network 130, a network 140, and a network 150.

The mobile device 400 is a device carried by a user and used to obtain content in an indoor or outdoor environment or consume content. Examples of the mobile device 400 may include a smartphone, a tablet, a smart watch, a wearable device, and an electronic book. The mobile device 400 may store information 110 obtained in an indoor or outdoor environment and may be placed on the wireless power transmission device 300 that is located indoors.

The wireless power transmission device 300 may transmit power by using at least one from among an inductive coupling method based on electromagnetic induction produced by a wireless power signal and an electromagnetic resonance coupling method based on electromagnetic resonance produced by a wireless power signal of a specific frequency.

The wireless power transmission device 300 transmits wireless power to the mobile device 400 by being triggered by a signal indicating that the mobile device 400 is placed on the wireless power transmission device 300, that is, the mobile device 400 is in contact with the wireless power transmission device 300. Also, the wireless power transmission device 300 provides a functionality related to interaction with at least one of the mobile device 400, the electronic device 500, and the external device 160, in response to the contact of the mobile device 400. Accordingly, the user may provide various functionalities using the mobile device 400 as well as charging the mobile device 400 by just placing the mobile device 400 on the wireless power transmission device 300 to charge the mobile device 400. The various functionalities may include, for example, a seamless content viewing mode, an environment setting control mode, a content synchronization mode, and an account synchronization mode.

The seamless content viewing mode refers to a mode in which due to triggering by a signal indicating that the mobile device 400 that is reproducing content is in contact with the wireless power transmission device 300, the content being reproduced by the mobile device 400 may be reproduced by the electronic device 500.

The environment setting control mode refers to a mode in which due to triggering by a signal indicating that the mobile device 400 is in contact with the wireless power transmission device 300, the external device 160 may be controlled by using environment setting control data stored in the mobile device 400.

The content synchronization mode refers to a mode in which due to triggering by a signal indicating that the mobile device 400 is in contact with the wireless power transmission device 300, content data stored in the mobile device 400 may be stored in and synchronized with the wireless power transmission device 300 or the electronic device 500 and the synchronized content may be displayed on the electronic device may be displayed.

The account synchronization mode refers to a mode in which due to triggering by a signal indicating that the mobile device 400 is in contact with the wireless power transmission device 300, account data stored in the mobile device 400 may be stored in and synchronized with the wireless power transmission device 300 or the electronic device 500 and the electronic device 500 may provide a content service by using the synchronized account data.

The wireless power transmission device 300 may communicate with the mobile device 400 through the network 120, may communicate with the electronic device 500 through the network 130, and may communicate with the external device 160 through the network 150.

The electronic device 500 may be connected wiredly or wirelessly through the network 130 to the wireless power transmission device 300 and may receive data through the wireless power transmission device 300 from the mobile device 400. The electronic device 500 may display content data received from the wireless power transmission device 300 on a display. The electronic device 500 may control the external device 160 through the network 150 by using environment setting control data received from the wireless power transmission device 300. It will be easily understood by one of ordinary skill in the art that the electronic device 500 may include, for example, a display device, and may be particularly implemented as, but is not limited to, an analog TV, a digital TV, a three-dimensional (3D)-TV, a smart TV, a light-emitting diode (LED) TV, an organic light-emitting diode (OLED) TV, a plasma TV, a monitor, or a set-top box (STB).

The electronic device 500 may also communicate with the mobile device 400 through the network 140.

The external device 160 may include a processor and a communicator and may communicate with other devices, and may include a home appliance mainly for setting an environment in a room. Although the external device 160 includes an external device 160-1, an external device 160-2, and an external device 160-3, the present disclosure is not limited thereto. The external device 160 may include, for example, an Internet of Things (IoT) device. Also, examples of the external device 160 may include a temperature controller, a humidity controller, a cooling/heating device, a door lock, various plugs, an audio device, and a video device.

Figure 2:
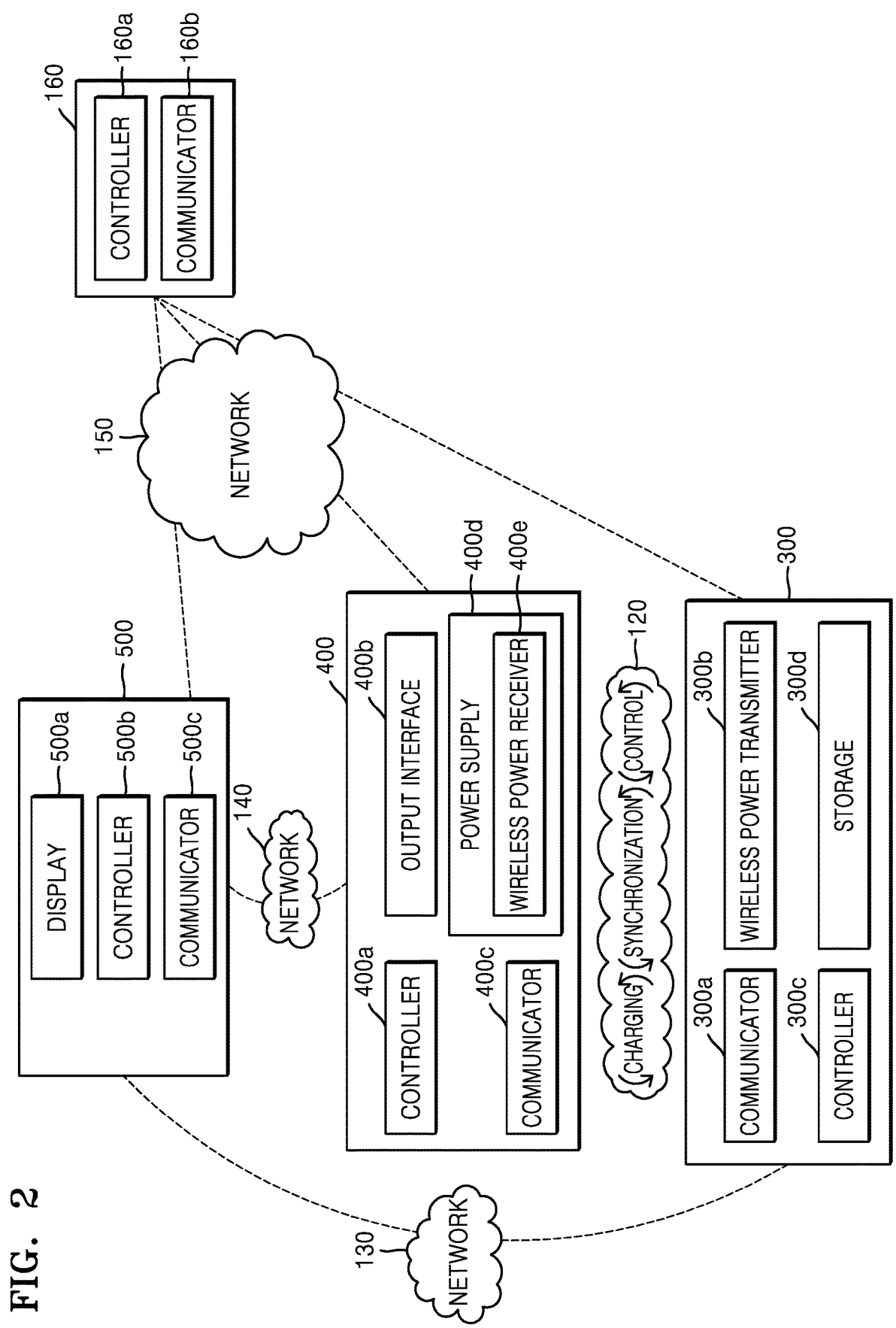
FIG. 2 is a schematic block diagram of each device of FIG. 1 according to an embodiment.

FIG. 2 is a schematic block diagram of each device of FIG. 1 according to an embodiment.

Referring to FIG. 2, the wireless power transmission device 300 includes a communicator 300*a*, a wireless power transmitter 300*b*, a controller 300*c*, and a storage 300*d*.

The communicator 300*a* may communicate with the mobile device 400, the electronic device 500, and the external device 160 by using one or more communication technologies. In particular, the communicator 300*a* may detect that the mobile device 400 is in contact with the wireless power transmission device 300 by using near-field communication (NFC).

The wireless power transmitter 300*b* transmits wireless power to the mobile device 400 that is in contact with the wireless power transmission device 300. The wireless power transmitter 300*b* may be configured to include a primary coil that forms a changing magnetic field in order to induce current in a secondary coil of the mobile device 400 according to an inductive coupling method. Also, in some embodiments, the wireless power transmitter 300*b* may be configured to include a coil or an antenna that forms a magnetic field having a specific resonance frequency in order to produce resonance in the mobile device 400 according to a resonance coupling method.

The wireless power transmitter 300*b* may perform a process of identifying the mobile device 400 or may determine whether to start transmitting wireless power according to a result of detecting the presence of the mobile device 400.

For example, the wireless power transmitter 300*b* may determine one or more from among a frequency, current, and a voltage used to form a wireless power signal according to a power control message including one or more from among power amount information, charge state information, and identification information of the mobile device 400.

In some embodiments, the wireless power transmitter 300*b* may receive the power control message through a wireless power signal. The wireless power transmitter 300*b* may obtain the power control message by receiving a modulated wireless power signal from the mobile device 400 and demodulating the modulated wireless power signal.

In some embodiments, the wireless power transmitter 300*b* may receive the power control message by using a method of receiving user data. For example, the wireless power transmitter 300*b* may obtain the power control message by receiving user data including the power control message through the communicator 300*a*.

The storage 300*d* may store data received by the wireless power transmission device 300 or data processed by the wireless power transmission device 300, or a program module used to execute the controller 300*c*.

According to an embodiment, the storage 300*d* may store a program module for transmitting wireless power to the mobile device 400, a module for performing one or more functions in response to contact of the mobile device 400, and a content stream, content data, account data, or environment setting data received from the mobile device 400.

The controller 300*c* includes one or more processors and controls overall elements of the wireless power transmission device 300.

According to an embodiment, the controller 300*c* may be triggered by the communicator 300*a* detecting that the mobile device 400 is in contact with the wireless power transmission device 300 and may perform one or more functions as well as transmitting wireless power to the mobile device 400. The one or more functions may include an operation of controlling interaction between the mobile device 400 and the wireless power transmission device 300, an operation of receiving data from the mobile device 400 and transmitting the data to the electronic device 500, and an operation of controlling the external device 160 by using data from the mobile device 400. In detail, the one or more functions may include a seamless content viewing mode, an environment setting control mode, a content synchronization mode, and an account synchronization mode.

According to an embodiment, the controller 300*c* may be triggered by the communicator 300*a* detecting that the mobile device 400 is in contact with the wireless power transmission device 300 and may output a user interface for selecting one or more functions through the electronic device 500 or the mobile device 400.

The wireless power transmission device 300 may supply power to a plurality of the electronic devices 500. According to an embodiment, the wireless power transmitter 300*b* may convert power supplied from a power supply unit into a wireless power signal and may apply the wireless power signal to the plurality of electronic devices 500. For example, when a plurality of the mobile devices 400, that is, one or more mobile devices of family members, are placed on the wireless power transmission device 300, wireless power may be transmitted to the one or more mobile devices.

The mobile device 400 includes a controller 400*a*, an output interface 400*b*, a communicator 400*c*, and a power supply 400*d*. However, all elements illustrated in FIG. 2 are not essential elements of the mobile device 400. The mobile device 400 may include elements more or fewer than those illustrated in FIG. 2.

The communicator 400c may communicate with the wireless power transmission device 300, the electronic device 500, and the external device 160 by using one or more communication technologies.

The output interface 400b may output data processed by the mobile device 400 by using an audio, a video, a vibration, or a tactile interface.

A wireless power receiver 400e may receive wireless power from the wireless power transmission device 300. The wireless power receiver 400e may receive wireless power from the wireless power transmission device 300 in response to contact between the mobile device 400 and the wireless power transmission device 300.

The wireless power receiver 400e may be configured to include a coil for receiving a wireless power signal applied as an oscillating magnetic field or electromagnetic field.

In some embodiments, the wireless power receiver 400e may include a coil for inducing current due to a changing magnetic field according to an inductive coupling method. In some embodiments, the wireless power receiver 400e may include a coil and a resonance forming circuit for producing resonance due to a magnetic field having a specific resonance frequency according to a resonance coupling method.

The power supply 400d may be configured to further include a charger and a battery.

The mobile device 400 receiving operating power from the power supply 400d may operate by power transmitted from the wireless power transmission device 300, or may charge the battery with the transmitted power and then may operate by the power charged in the battery. The charger charges the battery with the transmitted power.

The wireless power receiver 400e may apply a power control message to the wireless power transmission device 300. The power control message may be a message for instructing to start or terminate transmitting a wireless power signal to the wireless power transmission device 300.

In some embodiments, the wireless power receiver 400e may transmit the power control message through a wireless power signal. In some embodiments, the controller 400a may transmit the power control message by using a transmission method through user data.

The controller 400a includes one or more processors and controls overall elements in the mobile device 400. The controller 400a may perform one or more functions as well as receiving wireless power from the wireless power transmission device 300 in response to a signal indicating that the mobile device 400 is in contact with the wireless power transmission device 300. The one or more functions may include an operation of controlling interaction between the mobile device 400 and the wireless power transmission device 300, an operation of transmitting data stored in the mobile device 400 to the wireless power transmission device 300 or the electronic device 500, and an operation of controlling the external device 160 by using data of the mobile device 400. In detail, the one or more functions may include a seamless content viewing mode, an environment setting control mode, a content synchronization mode, and an account synchronization mode.

According to an embodiment, the controller 400a may be triggered by a signal indicating that the mobile device 400 is in contact with the wireless power transmission device 300 and may output a user interface for selecting one or more functions through the output interface 400b.

The electronic device 500 includes a display 500a, a controller 500b, and a communicator 500c.

The display 500a displays content. The content may include a video, an audio, an image, a game, and an application. In particular, the display 500a may automatically receive and seamlessly reproduce content that is being reproduced by the mobile device 400 in response to a signal indicating that the mobile device 400 that is reproducing the content is in contact with the wireless power transmission device 300.

The communicator 500c may communicate with the wireless power transmission device 300, the mobile device 400, and the external device 160 by using one or more communication technologies.

The controller 500b includes one or more processors and controls overall elements of the electronic device 500. In particular, the controller 500b may control the display 500a to automatically receive and seamlessly reproduce content that is being reproduced by the mobile device 400 in response to a signal indicating that the mobile device 400 that is reproducing the content is in contact with the wireless power transmission device 300. Also, the controller 500b may receive data stored in the mobile device 400 and may control the external device 160 by using the data. Also, the controller 500b may receive and synchronize account data or content data of the mobile device 400 through the wireless power transmission device 300.

The external device 160 includes a controller 160a and a communicator 160b.

The controller 160a includes one or more processors and controls overall elements in the external device 160. In particular, the controller 160a may control the external device 160 according to environment setting control data from the mobile device 400 in response to a signal indicating that the mobile device 400 is in contact with the wireless power transmission device 300. The controlling of the external device 160 may include, for example, changing a state of the external device 160 from a standby state to an on-state or controlling a set value of the external device 160.

The networks 120, 130, 140, and 150 allow communication among the wireless power transmission device 300, the mobile device 400, the electronic device 500, and the external device 160 by using wired or wireless communication technology.

In disclosed embodiments, although devices of FIG. 2 are named a wireless power transmission device, a mobile device, an electronic device, and an external device for convenience, the present disclosure is not limited thereto, and each device may be defined as a device including one or more processors and communicators and performing its corresponding function. For example, the wireless power transmission device may also be referred to as a wireless charging device, a plate, or a hub device.

Figure 3:
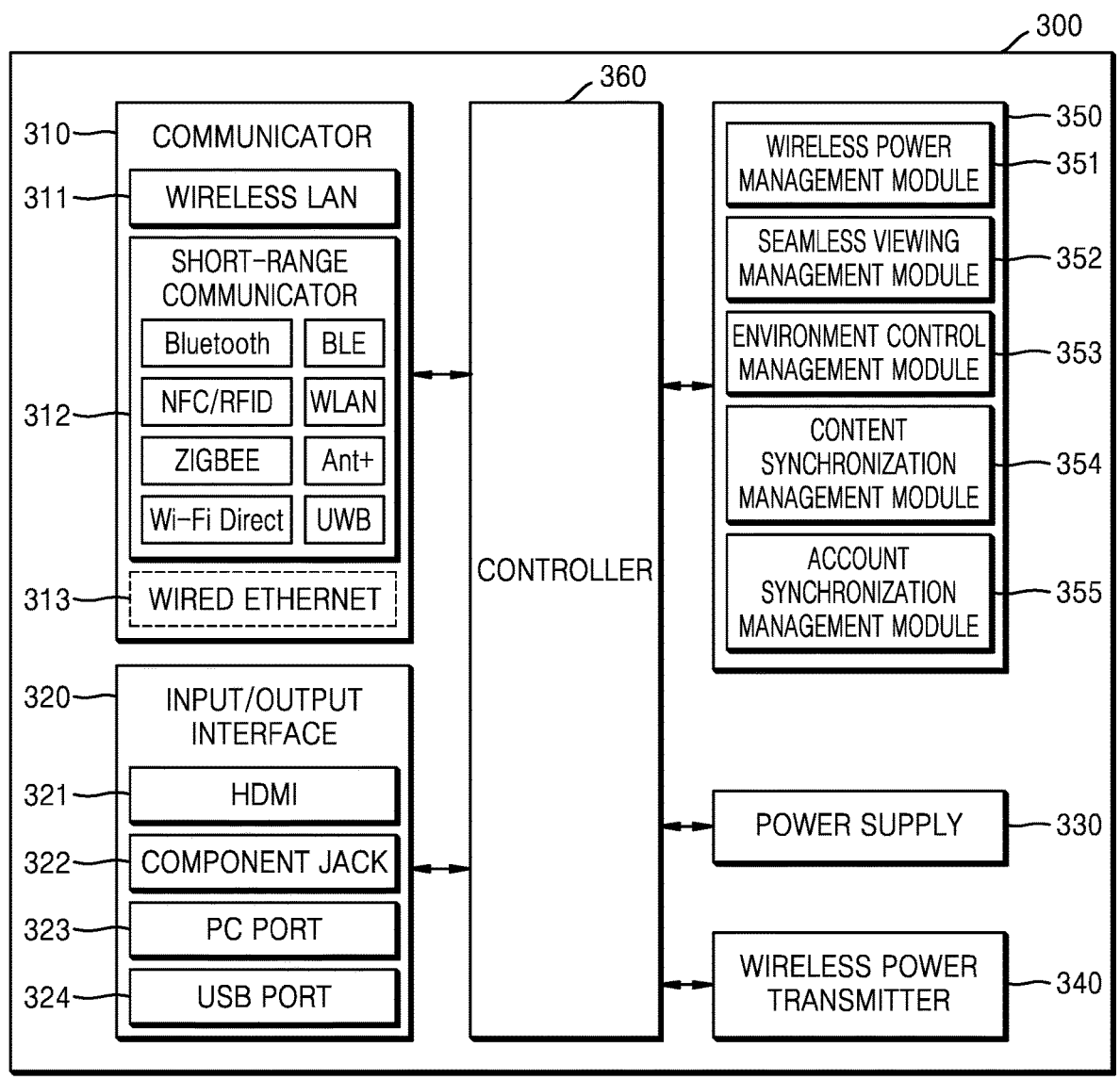
FIG. 3 is a detailed block diagram of a wireless power transmission device of FIG. 2.

FIG. 3 is a detailed block diagram of the wireless power transmission device 300 of FIG. 2.

Referring to FIG. 3, the wireless power transmission device 300 may include a communicator 310, an input/output interface 320, a power supply 330, a wireless power transmitter 340, a storage 350, and a controller 360.

The communicator 310 may include one or more elements that enable communication between the wireless power transmission device 300 and the mobile device 400, between the wireless power transmission device 300 and the electronic device 500, and between the wireless power transmission device 300 and the external device 160. For example, the communicator 310 may include a wireless local area network (LAN) 311, a short-range communicator 312, and a wired Ethernet 313. The wireless LAN 311 may support the wireless LAN standard (IEEE 802.11x) of the Institute of Electrical and Electronics Engineers (IEEE). Accordingly, the wireless LAN 311 may transmit/receive data according to the wireless LAN standard under the control of the controller 360.

Examples of the short-range communicator 312 may include Bluetooth, Bluetooth low energy (BEL), near field communication (NFC), infrared data association (IrDA), ZigBee, Ant+, Wi-Fi Direct (WFD), and ultra wideband (UWB).

According to an embodiment, the communicator 310 may detect that the mobile device 400 is in contact with the wireless power transmission device 300 by using NFC communication technology.

According to an embodiment, the communicator 310 may receive a content stream, content data to be synchronized, account data to be synchronized, and environment setting data from the mobile device 400 by using various communication technologies, and may transmit the received data to the electronic device 500 or the external device 160.

The input/output interface 320 receives a video (e.g., a moving picture), an audio (e.g., a voice or music), and additional information (e.g., an electronic program guide (EPG)) from the outside of the wireless power transmission device 300 under the control of the controller 360. The input/output interface 320 may include any one from among a high-definition multimedia interface (HDMI) port 321, a component jack 322, a personal computer (PC) port 323, and a universal serial bus (USB) port 324.

The power supply 330 supplies power to elements in the wireless power transmission device 300.

The wireless power transmitter 340 may receive power from a power source and may transmit the power to the mobile device 400 that is spaced apart by a predetermined distance. In this case, the wireless power transmitter 340 may receive identification information or power information of the mobile device 400 from the mobile device 400 and may transmit corresponding power to a wireless power receiver of the mobile device 400.

The wireless power transmitter 340 may convert power supplied from a power source into electromagnetic wave energy of a predetermined frequency and may transmit the electromagnetic wave energy to the mobile device 400. For example, the wireless power transmitter 340 may generate a magnetic field that vibrates at the predetermined frequency. In this case, the predetermined frequency may range from hundreds of Hz to tens of MHz.

Also, the wireless power transmitter 340 may include a magnet and at least one resonant coil. The resonant coil may have any one of, but not limited to, a spiral structure and a helical structure. The resonant coil may be formed of a predetermined material including protons, and the magnet may create a magnetic field that vibrates at the predetermined frequency by rotating the protons in the resonant coil.

The storage 350 may include a wireless power management module 351, a seamless viewing management module 352, an environment control management module 353, a content synchronization management module 354, and an account synchronization management module 355.

The wireless power management module 351 may include one or more instructions that transmit wireless power to the mobile device 400 in response to a signal indicating that the mobile device 400 is in contact with the wireless power transmission device 300.

The seamless viewing management module 352 may include one or more instructions that enable content being reproduced by the mobile device 400 to be seamlessly reproduced by the electronic device 500 in response to a signal indicating that the mobile device 400 is in contact with the wireless power transmission device 300.

The environment control management module 353 may include one or more instructions that enable the external device 160 to be controlled by using environment setting data from the mobile device 400 in response to a signal indicating that the mobile device 400 is in contact with the wireless power transmission device 300. The environment control management module 353 may include one or more instructions that enable the environment setting data stored in the wireless power transmission device 300 to be transmitted to the mobile device 400 in response to a signal indicating that the mobile device 400 is in contact with the wireless power transmission device 300.

The content synchronization management module 354 may include one or more instructions that enable content data stored in the mobile device 400 to be synchronized with the wireless power transmission device 300 or the electronic device 500 in response to a signal indicating that the mobile device 400 is in contact with the wireless power transmission device 300.

The account synchronization management module 355 may include one or more instructions that enable account data stored in the mobile device 400 to be synchronized with the wireless power transmission device 300 or the electronic device 500 in response to a signal indicating that the mobile device 400 is in contact with the wireless power transmission device 300.

The storage 350 may store the content data, account data, or environment setting data received from the mobile device 400.

The controller 360 may control an overall operation of the wireless power transmission device 300. For example, the controller 360 may control the wireless power transmitter 340 and the communicator 310.

According to an embodiment, by executing instructions of one or more modules included in the storage 350, the controller 360 may perform one or more functions as well as detecting that the mobile device 400 is in contact with the wireless power transmission device 300 and transmitting wireless power to the mobile device 400. The one or more functions may include a seamless content viewing mode, a content synchronization mode, an account synchronization mode, and an environment setting control mode.

The wireless power transmission device 300 may be coupled to another device. For example, the wireless power transmission device 300 may be coupled to a sound bar, an STB, an Internet protocol (IP) STB, or a digital broadcast receiver. Also, the wireless power transmission device 300 may be coupled to an input/output device that is connected by wire or wirelessly to the electronic device 500 and any of various external sources such as an antenna cable, an STB, or a media player.

Figure 4:
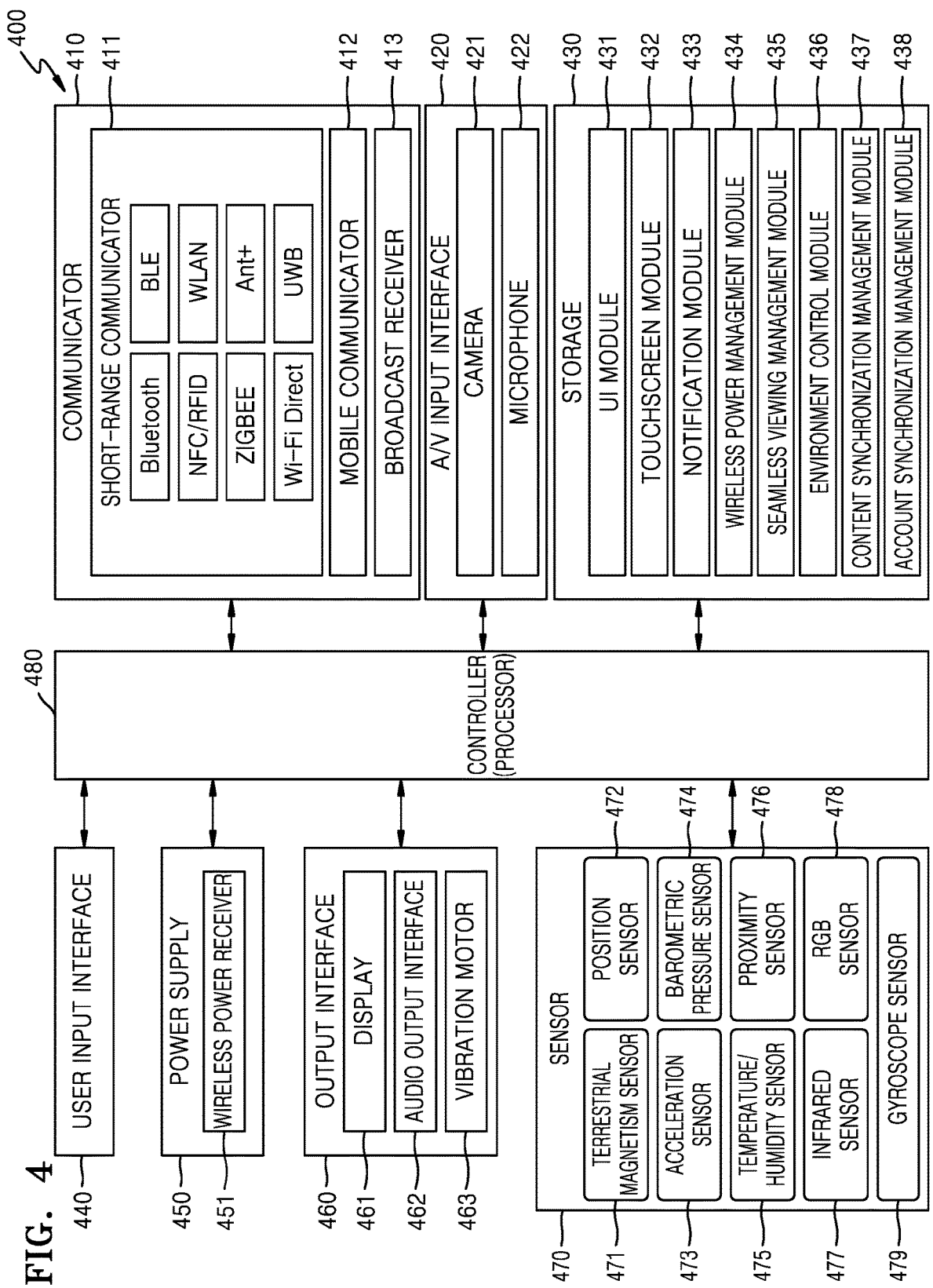
FIG. 4 is a detailed block diagram of a mobile device of FIG. 2.

FIG. 4 is a detailed block diagram of the mobile device 400 of FIG. 2.

In some embodiments, the mobile device 400 may include a communicator 410, an audio/video (A/V) input interface 420, a storage 430, a user input interface 440, a power supply 450, an output interface 460, and a sensor 470.

The communicator 410 may include one or more elements that enable communication between the mobile device 400 and the wireless power transmission device 300, between the mobile device 400 and the electronic device 500, and between the mobile device 400 and the external device 160.

For example, the communicator 410 may include a short-range communicator 411, a mobile communicator 412, and a broadcast receiver 413.

Examples of the short-range communicator (e.g., a short-range wireless communication unit) 411 may include, but are not limited to, a BLE communicator, an NFC communicator, a WLAN communicator, a ZigBee communicator, an IrDA communicator, a WFD communicator, an UWB communicator, and an Ant+ communicator.

The mobile communicator 412 transmits/receives a wireless signal to/from at least one from among a base station, an external terminal, and a server through a mobile communication network. Examples of the wireless signal may include a voice call signal, a video call signal, and any of various pieces of data according to text/multimedia message transmission/reception.

The broadcast receiver 413 receives a broadcast signal and/or broadcast-related information from the outside through a broadcast channel. Examples of the broadcast channel may include a satellite channel and a terrestrial channel. According to an embodiment, the mobile device 400 may not include the broadcast receiver 413.

According to an embodiment, the communicator 410 may detect contact of the wireless power transmission device 300 by starting communication with the wireless power transmission device 300 by using NFC communication technology.

According to an embodiment, when the mobile device 400 is spaced apart by a predetermined distance from the wireless power transmission device 300, the communicator 410 may transmit a power control message including identification information of the mobile device 400 and a charge state and power information of the mobile device 400 to the wireless power transmission device 300.

According to an embodiment, the communicator 410 may transmit, to the wireless power transmission device 300, content data or account data stored in the mobile device 400.

According to an embodiment, the communicator 410 may transmit, to the wireless power transmission device 300, a content stream being reproduced by the mobile device 400 or information about the content stream.

The AN input interface 420 for inputting an audio signal or a video signal may include a camera 421 and a microphone 422. The camera 421 may obtain image frames such as a still image or a moving image by using an image sensor in a video call mode or an imaging mode. An image captured by the image sensor may be processed by the controller 480 or an additional image processor (not shown). The microphone 422 receives an external sound signal and processes the external sound signal into electrical voice data.

The storage 430 may store a program for processing and controlling the controller 480, and may store data input to the mobile device 400 or output from the mobile device 400.

According to an embodiment, the storage 430 may store environment setting data including a value for setting an indoor environment, account data related to service subscription to a content or service provider, and content data obtained by a users activity.

The storage 430 may include at least one type of storage medium from among a flash memory type, a hard disk type, a multimedia card micro type, a card type memory (e.g., a secure digital (SD) or XD memory), a random-access memory (RAM), a static RAM (SRAM), a read-only memory (ROM), an electrically erasable programmable ROM (EEPROM), a programmable ROM (PROM), a magnetic memory, a magnetic disk, and an optical disk.

Programs stored in the storage 430 may be classified into a plurality of modules according to functions of the storage 430. For example, the storage 430 may include a user interface (UI) module 431, a touchscreen module 4321, a notification module 433, a wireless power management module 434, a seamless viewing management module 435, an environment control module 436, a content synchronization management module 437, and an account synchronization management module 438.

The UI module 431 may provide a specialized UI or graphical user interface (GUI) that interoperates with the mobile device 400 according to an application.

The touchscreen module 432 may detect a touch gesture on a touchscreen of the user and may transmit information about the touch gesture to the controller 480.

The notification module 433 may generate a signal for notifying an event occurring in the mobile device 400. The notification module 433 may output a notification signal as a video signal through a display 461, may output a notification signal as an audio signal through an audio output interface 462, or may output a notification signal as a vibration signal through a vibration motor 463.

According to an embodiment, the notification module 433 may include one or more instructions that output, by using a video signal, an audio signal, or a vibration signal, a user interface for selecting a functionality menu that may operate in response to contact between the mobile device 400 and the wireless power transmission device 300.

The wireless power management module 434 may include one or more instructions that enable wireless power to be received from the wireless power transmission device 300 in response to a signal indicating that the mobile device 400 is in contact with the wireless power transmission device 300.

The seamless viewing management module 435 may include one or more instructions that enable content being reproduced by the mobile device 400 or information about the content to be transmitted to the electronic device 500 or the wireless power transmission device 300 in response to a signal indicating that the mobile device 400 is in contact with the wireless power transmission device 300.

The environment control module 436 may include one or more instructions that enable the external device 160 to be directly controlled by using environment setting data stored in the mobile device 400 or the environment setting data stored in the mobile device 400 to be transmitted to the wireless power transmission device 300 or the electronic device 500 in response to a signal indicating that the mobile device 400 is in contact with the wireless power transmission device 300.

Also, the environment control module 436 may include one or more instructions that enable the environment setting data stored in the wireless power transmission device 300 to be received and stored in response to a signal indicating that the mobile device 400 is in contact with the wireless power transmission device 300. The content synchronization management module 437 may include one or more instructions that enable content data stored in the mobile device 400 to be transmitted to the wireless power transmission device 300 in response to a signal indicating that the mobile device 400 is in contact with the wireless power transmission device 300.

The account synchronization management module 438 may include one or more instructions that enable account data stored in the mobile device 400 to be transmitted to the wireless power transmission device 300 in response to a signal indicating that the mobile device 400 is in contact with the wireless power transmission device 300.

The user input interface 440 is a unit through which the user inputs data for controlling the mobile device 400. Examples of the user input interface 440 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jog switch.

According to an embodiment, the user input interface 440 may receive a user input that selects whether to activate a functionality menu through a user interface that inquires whether to activate the functionality menu in response to a signal indicating that the mobile device 400 is in contact with the wireless power transmission device 300.

The power supply 450 may supply, to elements in the mobile device 400, power input from an external power source or power output from one or more batteries provided in the mobile device 400 under the control of the controller 480.

According to an embodiment, the power supply 450 includes a wireless power receiver 451. The wireless power receiver 451 may receive wireless power from the wireless power transmission device 300.

For example, the wireless power receiver 451 may receive electromagnetic wave energy from the wireless power transmission device 300 by adjusting a frequency transmitted by the wireless power transmission device 300 and a resonance frequency or a lamor frequency of the wireless power receiver 451.

For example, the wireless power receiver 451 may include a magnet and at least one resonant coil. The resonant coil may have any one of, but not limited to, a spiral structure and a helical structure. The resonant coil may be formed of a predetermined material including protons, and the magnet may create a magnetic field that vibrates at a predetermined frequency by rotating the protons in the resonant coil. The wireless power receiver 451 may adjust a resonance frequency of the protons in the resonant coil by adjusting a magnetic flux density of the magnet. Accordingly, the wireless power receiver 451 may obtain electromagnetic wave energy of the wireless power transmission device 300 through magnetic coupling with the wireless power transmission device 300 by adjusting the magnetic flux density of the magnet.

Also, the wireless power receiver 451 may include a capacitor for storing electromagnetic wave energy received from the wireless power transmission device 300. However, it will be easily understood by one of ordinary skill in the art that disclosed embodiments are not limited to the wireless power reception method of the wireless power receiver 451, and wireless power may be received according to another wireless power reception method (e.g., an electromagnetic induction method or an electromagnetic wave method).

The output interface 460 may output an audio signal, a video signal, or a vibration signal, and may include the display 461, the audio output interface 462, and the vibration motor 463.

The display 461 displays and outputs information processed by the mobile device 400. For example, the display 461 may display content that is selected by the user to be reproduced. Also, the display 461 may output a user interface that inquires whether to activate a functionality menu or a user interface that provides the functionality menu in response to a signal indicating that the mobile device 400 is in contact with the wireless power transmission device 300.

When the display 461 and a touchpad have a layer structure to form a touchscreen, the display 461 may be used as an input device as well as an output device. The display 461 may include at least one from among a liquid crystal display (LCD), a thin film transistor-liquid crystal display, an OLED, a flexible display, a 3D display, and an electrophoretic display.

The audio output interface 462 may output audio data received from the communicator 410 or stored in the storage 430 by using a speaker or a buzzer.

The vibration motor 463 may output a vibration signal.

The sensor 470 may detect a state of the mobile device 400 or a state around the mobile device 400, and may transmit information about the state to the controller 480.

The sensor 470 may include at least one from among, but not limited to, a terrestrial magnetism sensor 471, a position sensor (e.g., a global positioning system (GPS)) 472, an acceleration sensor 473, a barometric pressure sensor 474, a temperature/humidity sensor 475, a proximity sensor 476, an infrared sensor 477, an RGB sensor (e.g., an illuminance sensor) 478, and a gyroscope sensor 479. Functions of the sensors would have been intuitively derived by one of ordinary skill in the art from their names, and thus a detailed explanation thereof will not be given.

The controller 480 controls an overall operation of the mobile device 400. For example, the controller 480 may control the user input interface 440, the output interface 460, the sensor 470, the communicator 410, and the AN input unit 420 by executing programs stored in the storage 430.

In detail, by executing instructions included in one or more modules stored in the storage 430, the controller 480 may perform one or more functions as well as detecting that the mobile device 400 is in contact with the wireless power transmission device 300 and receiving wireless power from the wireless power transmission device 300. The one or more functions may include a seamless viewing mode, an environment control mode, a content synchronization mode, and an account synchronization mode.

Figure 5:
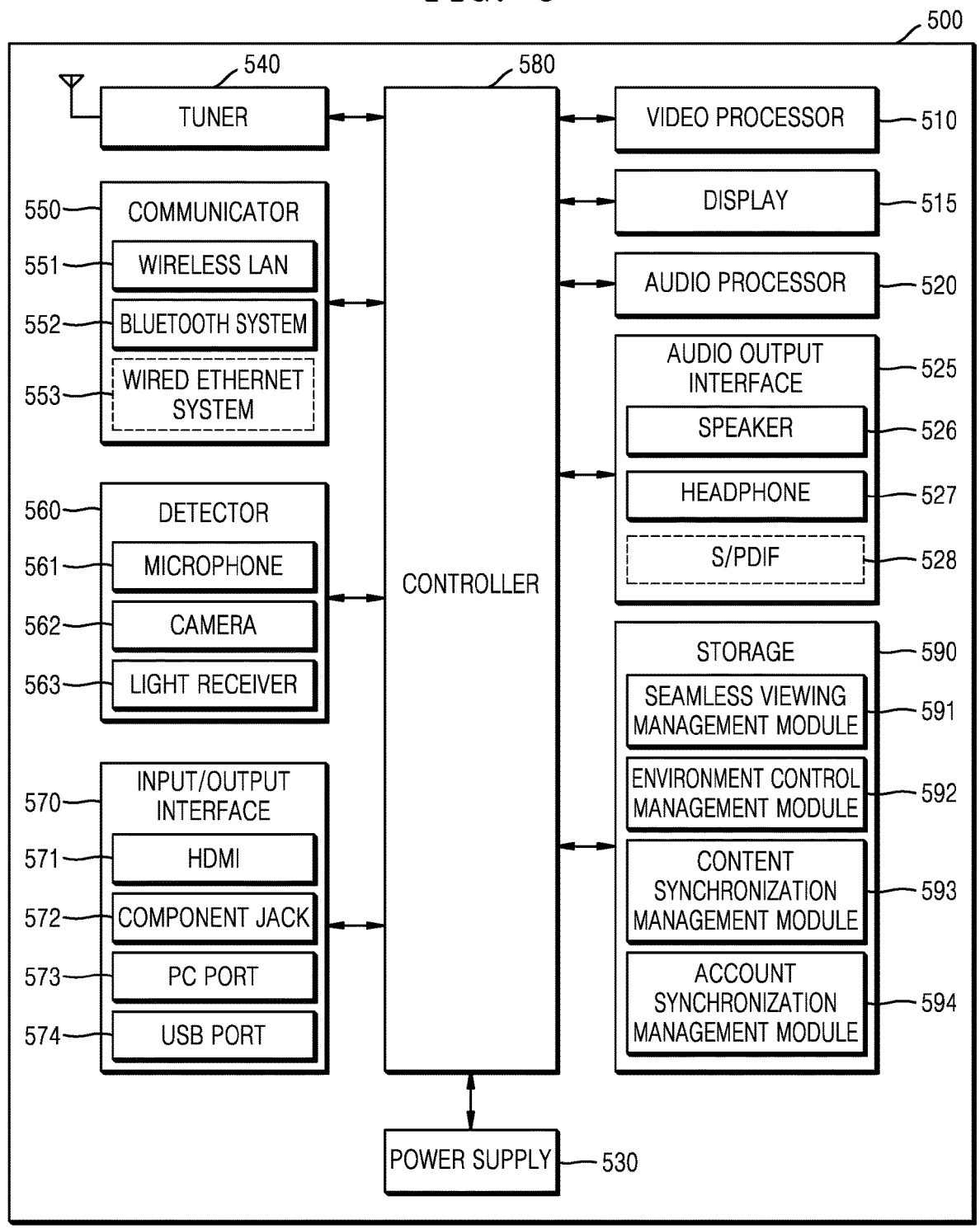
FIG. 5 is a detailed block diagram of an electronic device of FIG. 2.

FIG. 5 is a detailed block diagram of the electronic device 500 of FIG. 2.

Referring to FIG. 5, the electronic device 500 includes a video processor 510, a display 515, an audio processor 520, an audio output interface 525, a power supply 530, a tuner 540, a communicator 550, a detector 560, an input/output interface 570, a controller 580, and a storage 590.

The video processor 510 processes video data received by the electronic device 500.

The display 515 may display a broadcast signal received by the tuner 540, content (e.g., a moving picture) input through the communicator 550 or the input/output unit 170, and an image stored in the storage 590 under the control of the controller 580.

According to an embodiment, the display 515 displays and outputs information processed by the electronic device 500. For example, the display 515 may display content selected by a user to be reproduced. Also, the display 515 may output a user interface that inquires whether to activate a functionality menu or a user interface that provides the functionality menu in response to a signal indicating that the mobile device 400 is in contact with the wireless power transmission device 300.

The audio processor 520 processes audio data.

The audio output interface 525 may output an audio included in a broadcast signal received by the tuner 540, or an audio (e.g., a voice or a sound) input through the communicator 550 or the input/output interface 570 under the control of the controller 580.

The power supply 530 supplies power input from an external power source to the elements 510 through 590 included in the electronic device 500 under the control of the controller 580. Also, the power supply 530 may supply, to the elements 510 through 590, power output from one or more batteries provided in the electronic device 500 under the control of the controller 580.

The tuner 540 may receive a broadcast signal in a frequency band corresponding to a channel number according to a user input. The tuner 540 may receive a broadcast signal from any of various sources such as a terrestrial broadcast source, a cable broadcast source, a satellite broadcast source, or an Internet broadcast source.

The communicator 550 may connect the electronic device 500 to an external device (e.g., an audio device) under the control of the controller 580. The controller 580 may transmit/receive content to/from the external device connected through the communicator 550, may download an application from the external device, or may perform web browsing. The communicator 550 may include any one from among a wireless LAN 551, a Bluetooth system 552, and a wired Ethernet system 553 according to a performance and a structure of the electronic device 500. The communicator 550 may further include a short-range communication system (e.g., an NFC system) or a BLE system other than the Bluetooth system 552.

The detector 560 detects an uttered voice of the user, an image of the user, or an interaction of the user.

A microphone 561 receives an uttered voice of the user. The microphone 561 may convert the received uttered voice into an electrical signal and may output the electrical signal to the controller 580.

A camera 562 receives an image (e.g., continuous frames) corresponding to a motion of the user including a gesture in a recognition range. The camera 562 may convert the received image into an electrical signal and may output the electrical signal to the controller 580 under the control of the controller 580. The camera 562 may include a lens and an image sensor.

A light receiver 563 receives an optical signal (including a control signal) from an external control device such as a remote controller. The light receiver 563 may receive an optical signal corresponding to a user input (e.g., a touch, a pressure, a touch gesture, a voice, or a motion) from the external control device. The control signal may be extracted from the received optical signal under the control of the controller 580.

The input/output unit 570 receives a video (e.g., a moving picture), an audio (e.g., a voice or music), and additional information (e.g., an EPG) from the outside of the electronic device 500 under the control of the controller 580. The input/output unit 570 may include any one form among an HDMI port 571, a component jack 572, a PC port 573, and a USB port 574.

The storage 590 may store various data, programs, or applications for driving and controlling the electronic device 500 under the control of the controller 580. The storage 590 may store signals or data input/output according to operations of the video processor 510, the display 515, the audio processor 520, the audio output unit 525, the power supply 530, the tuner 540, the communicator 550, the detector 560, and the input/output interface 570. The storage 590 may store a control program for controlling the electronic device 500 and the controller 580, an application downloaded from the outside or initially provided by a manufacturer, a GUI related to an application, an object (e.g., an image, text, an icon, or a button) for providing the GUI, user information, a document, databases, or related data.

The storage 590 may include a nonvolatile memory, a volatile memory, a hard disk drive (HDD), or a solid-state drive (SSD).

According to an embodiment, the storage 590 may include a seamless viewing management module 591, an environment control management module 592, a content synchronization management module 593, and an account synchronization management module 594.

The seamless viewing management module 591 may include one or more instructions that receive a content stream being reproduced by the mobile device 400 or receive information about the content being reproduced by the mobile device 400 and access the content, and enable the content being reproduced by the mobile device 400 to be seamlessly reproduced by the display 515.

The environment control management module 592 may include one or more instructions that receive environment setting data stored in the mobile device 400 from the mobile device 400 or through the wireless power transmission device 300, and enable one or more external devices 160 to be controlled by using the received environment setting data.

The content synchronization management module 593 may include one or more instructions that receive content data stored in the mobile device 400 from the mobile device 400 or through the wireless power transmission device 300, and enable the received content data to be stored in the electronic device 500.

The account synchronization management module 594 may include one or more instructions that receive account data stored in the mobile device 400 from the mobile device 400 or through the wireless power transmission device 300, and enable the received account data to be stored in the electronic device 500.

The controller 580 controls an overall operation of the electronic device 500 and signal transmission/reception between the elements 510 through 590 of the electronic device 500, and processes data. When a user input occurs or satisfies a condition that is previously set and stored, the controller 580 may execute an operating system (OS) and various applications stored in the storage 590.

The controller 580 may include a RAM in which a signal or data input from the outside of the electronic device 500 is stored or that is used as a storage area corresponding to any of various operations performed by the electronic device 500, a ROM in which a control program for controlling the electronic device 500 is stored, and a processor.

The processor may include a graphics processing unit (GPU) for performing graphics processing on a video. The processor may be provided as a system-on-chip (SoC) in which a core (not shown) is combined with a GPU (not shown). Also, the processor may include a plurality of processors.

According to an embodiment, the controller 580 may perform one or more functions by performing instructions included in one or more modules stored in the storage 590. The one or more functions may include a seamless viewing mode, an environment control mode, a content synchronization mode, and an account synchronization mode.

Also, the electronic device 500 including the display 515 may be electrically connected to an additional external device (e.g., a set-top box (not shown)) including a tuner. For example, it will be easily understood by one of ordinary skill in the art that the electronic device 500 may be, but is not limited to, an analog TV, a digital TV, a 3D-TV, a smart TV, an LED TV, an OLED TV, a plasma TV, or a monitor.

At least one element may be added to or omitted from the elements (e.g., 510 through 590) of the electronic device 500 of FIG. 5 according to a performance of the electronic device 500. Also, it will be easily understood by one of ordinary skill in the art that positions of the elements (e.g., 510 through 590) may vary according to a performance or a structure of the electronic device 500.

Figure 6:
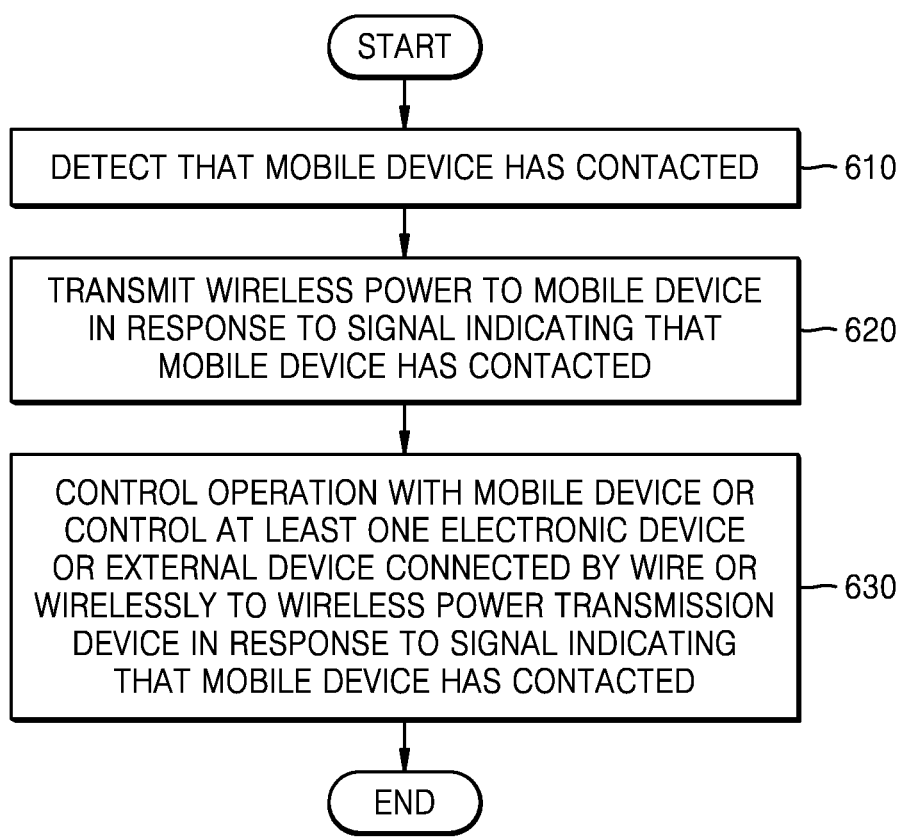
FIG. 6 is a flowchart illustrating an operation of a wireless power transmission device according to an embodiment.

FIG. 6 is a flowchart illustrating an operation of a wireless power transmission device according to an embodiment.

Referring to FIG. 6, in operation 610, a wireless power transmission device detects that a mobile device is in contact with the wireless power transmission device.

The wireless power transmission device may detect that the mobile device is in contact with the wireless power transmission device when a wireless power receiver receives a wireless power signal including a wireless power message from the mobile device or communication data including the wireless power message is received through a communicator.

In operation 620, the wireless power transmission device transmits wireless power to the mobile device in response to a signal indicating that the mobile device is in contact with the wireless power transmission device.

When the wireless power transmission device receives the signal indicating that the mobile device is in contact with the wireless power transmission device, that is, the wireless power message, the wireless power transmission device may transmit wireless power to the mobile device by referring to identification information of the mobile device or power information of the mobile device included in the wireless power message.

In operation 630, the wireless power transmission device controls an operation with the mobile device or controls at least one electronic device or external device connected by wire or wirelessly to the wireless power transmission device in response to the signal indicating that the mobile device is in contact with the wireless power transmission device.

The wireless power transmission device may perform one or more functions as well as transmitting wireless power like in operation 620, in response to the signal indicating that the mobile device is in contact with the wireless power transmission device, that is, the wireless power message.

The one or more functions may include a function of controlling an operation with the mobile device, a function of controlling at least one electronic device connected by wire or wirelessly to the wireless power transmission device, or a function of controlling at least one external device connected by wire or wirelessly to the wireless power transmission device.

The function of controlling the operation with the mobile device may include, for example, a content synchronization function and an account data synchronization function.

The function of controlling at least one electronic device connected by wire or wirelessly to the wireless power transmission device may include, for example, a seamless content viewing function.

The function of controlling at least one external device connected by wire or wirelessly to the wireless power transmission device may include, for example, an environment control setting function.

Figure 7:
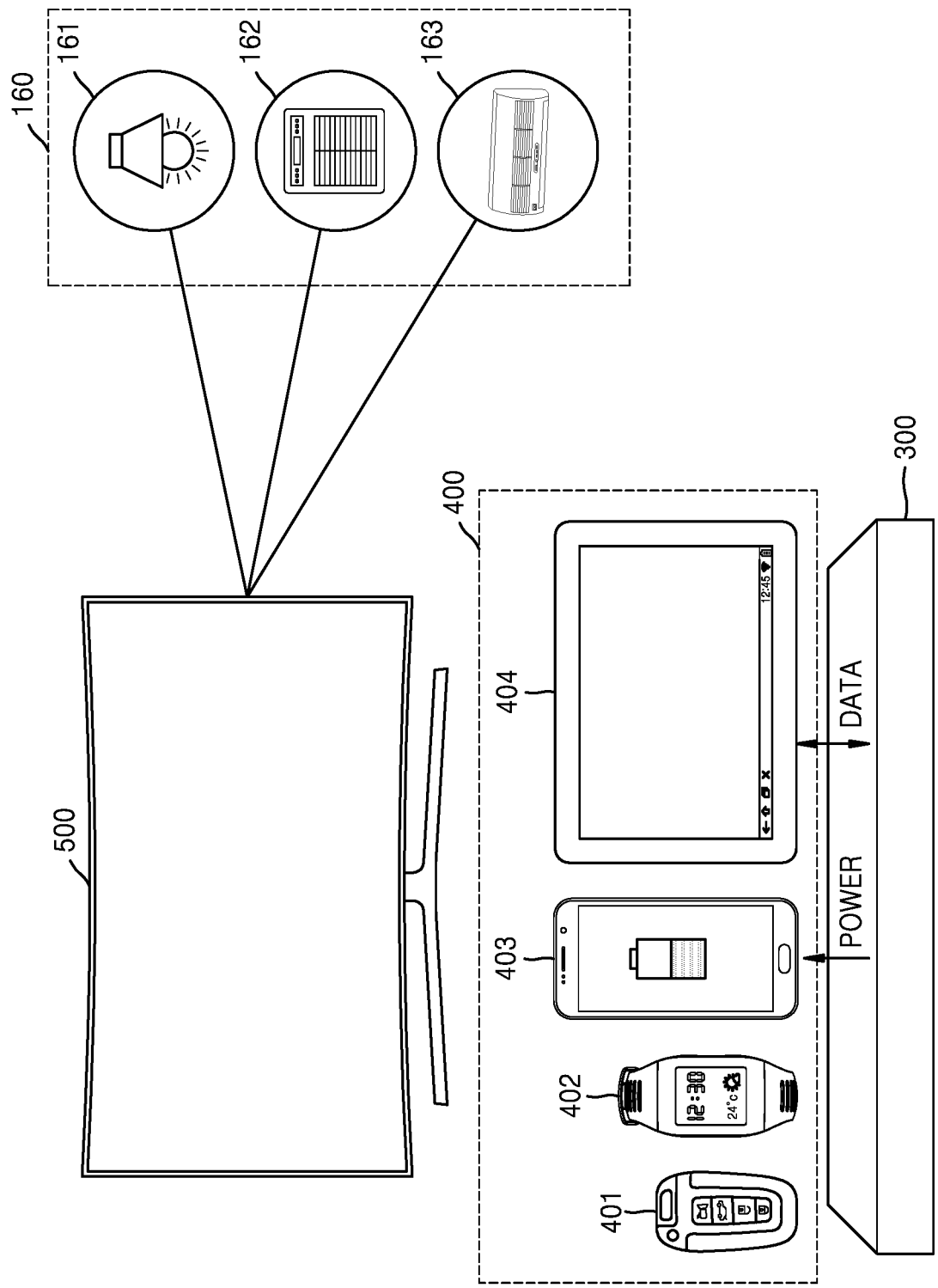
FIG. 7 is a reference diagram for explaining operations performed by the wireless power transmission device of FIG. 6.

FIG. 7 is a reference diagram for explaining one or more functions performed by the wireless power transmission device 300 as well as transmitting wireless power.

Referring to FIG. 7, the wireless power transmission device 300 may perform one or more functions from among a content synchronization function, an account data synchronization function, a seamless content viewing function, and an environment control setting function as well as transmitting wireless power to the mobile device 400. It will be understood that the functions are examples, and may further include any other function as long as it relates to a function of controlling an operation with the mobile device 400, a function of controlling the electronic device 500, and a function of controlling the external device 160.

The mobile device 400 may be any of various mobile devices, and examples of the mobile device 400 may include a smart key 401, a smart watch 402, a smartphone 403, and a table 404.

The wireless power transmission device 300 may synchronize content of the mobile device 400 and the wireless power transmission device 300 by receiving content data stored in the mobile device 400 and storing the content data in the wireless power transmission device 300 or transmitting the content data to the electronic device 500 that is connected by wire or wirelessly as well as transmitting wireless power to the mobile device 400 according to contact of the mobile device 400. The content synchronized in such a content synchronization function may include all content stored in the mobile device 400 during a user's operation such as still image content such as a photograph or moving picture content such as a video.

The wireless power transmission device 300 may synchronize account data by receiving the account data stored in the mobile device 400 and storing the account data in the wireless power transmission device 300 or transmitting the account data to the electronic device 500 that is connected by wire or wirelessly as well as transmitting wireless power to the mobile device 400 according to contact of the mobile device 400. The account data may include information used by the user to subscribe to a service or content provider, information related to the subscription, and information set by the user to receive content or a service. Since the wireless power transmission device 300 transmits the synchronized account data to the electronic device 500, when the user is to watch content or a service through the electronic device 500, the electronic device 500 may access and output the content or the service by using the synchronized account data received from the wireless power transmission device 300.

The wireless power transmission device 300 may control the mobile device 400 and the electronic device 500 to seamlessly reproduce content, being reproduced by the mobile device 400, by the electronic device 500 as well as transmitting wireless power to the mobile device 400 according to contact of the mobile device 400.

The wireless power transmission device 300 may control at least one of the mobile device 400 and the electronic device 500 in order to control one or more external devices 160 by using environment control setting data of the mobile device 400 as well as transmitting wireless power to the mobile device 400 according to contact of the mobile device 400. The wireless power transmission device 300 may also transmit environment control setting data stored in the wireless power transmission device 300 to the mobile device 400.

A function performed by the wireless power transmission device 300 will now be explained in detail.

Figure 8:
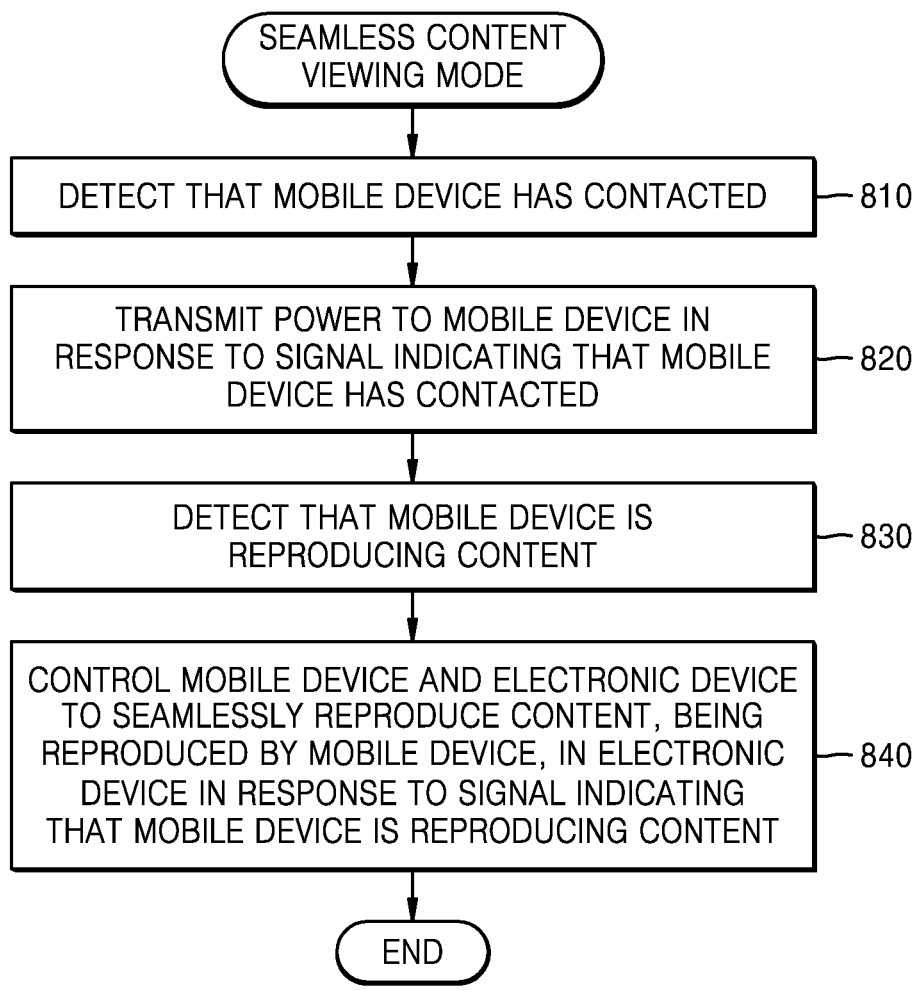
FIG. 8 is a flowchart illustrating a seamless content viewing operation performed by a wireless power transmission device according to an embodiment.
Figure 9:
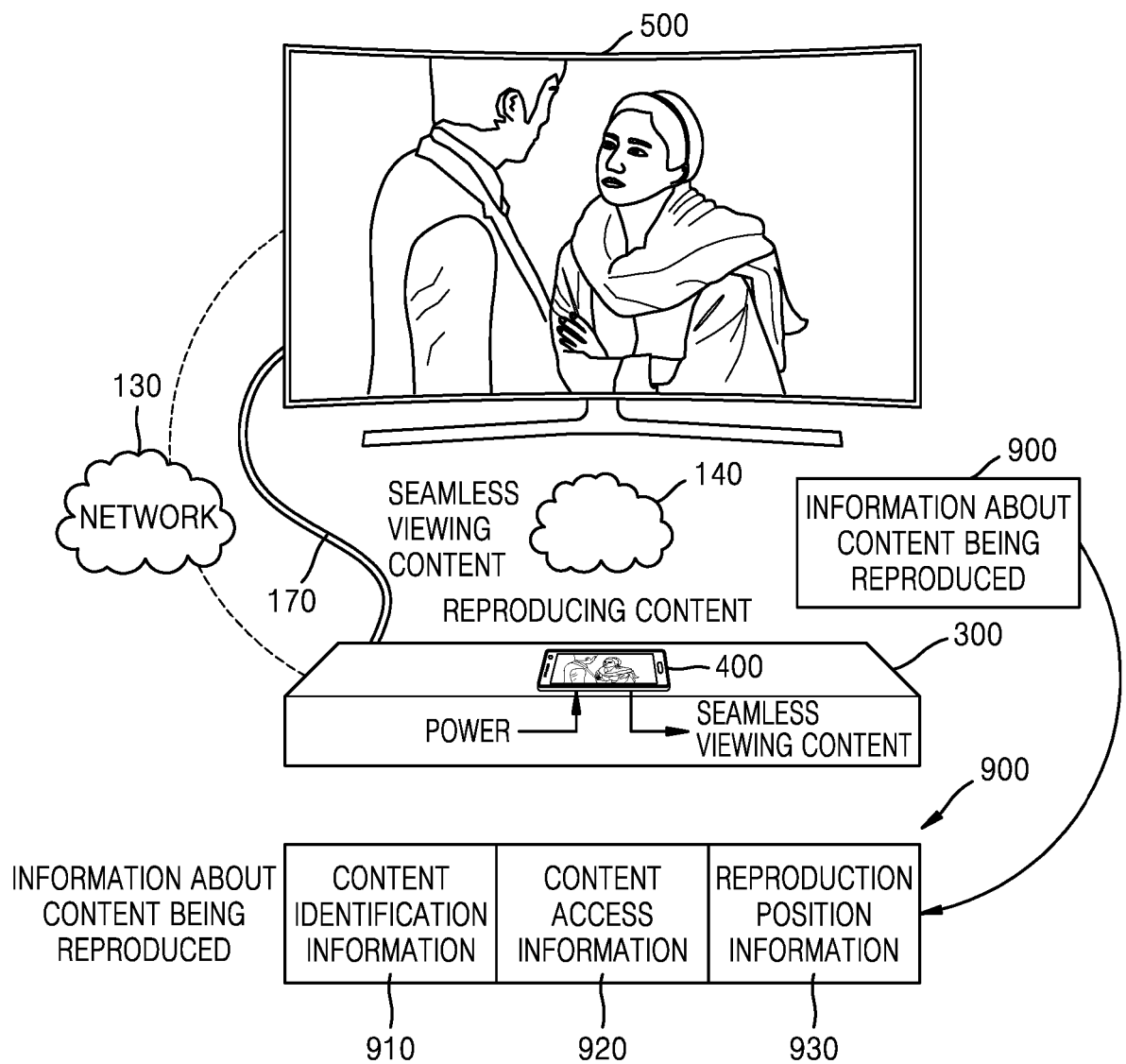
FIG. 9 is a reference diagram for explaining the seamless content viewing operation of FIG. 8.

FIG. 8 is a flowchart illustrating a seamless content viewing operation performed by a wireless power transmission device according to an embodiment. FIG. 9 is a reference diagram for explaining the seamless content viewing operation of FIG. 8.

The seamless content viewing operation performed by the wireless power transmission device will be described with reference to FIGS. 8 and 9.

Referring to FIG. 8, in operation 810, a wireless power transmission device detects that a mobile device is in contact with the wireless power transmission device.

In operation 820, the wireless power transmission device transmits wireless power to the mobile device in response to a signal indicating that the mobile device is in contact with the wireless power transmission device.

In operation 830, the wireless power transmission device detects that the mobile device is reproducing content.

The mobile device 400 may transmit information about content being currently reproduced by the mobile device 400 through a power control message transmitted to the wireless power transmission device 300 or may transmit the information about the content being currently reproduced by the mobile device 400 to the wireless power transmission device 300 through data communication using a communicator. The wireless power transmission device 300 may detect that the mobile device 400 is reproducing the content by receiving the information about the content from the mobile device 400.

Referring to FIG. 9, information 900 about content that is being reproduced may include at least one from among content identification information 910 for identifying the content, content access information 920 such as a uniform resource locator (URL) for accessing the content, and reproduction position information 930 indicating a portion where the content is being reproduced.

In operation 840, the wireless power transmission device controls the mobile device and an electronic device to seamlessly reproduce the content, being reproduced by the mobile device, in the electronic device in response to a signal indicating that the content is being reproduced by the mobile device.

Referring to FIG. 9, according to an embodiment, the wireless power transmission device 300 may receive content to be seamlessly viewed from the mobile device 400 and may transmit the received content to the electronic device 500 through a wire 170.

According to an embodiment, the wireless power transmission device 300 may receive the content to be seamlessly viewed from the mobile device 400, and may transmit the received content to the electronic device 500 through the network 130. The electronic device 500 may seamlessly reproduce the content received from the mobile device 400.

According to an embodiment, the wireless power transmission device 300 may obtain information about content being reproduced by the mobile device 400 from communication data or a power control message received from the mobile device 400, and may transmit the obtained information about the content to the electronic device 500 by wire or wirelessly. The information about the content may include content identification information, access information for accessing the content, and information about a portion where the content is being reproduced. The electronic device 500 may receive the information about the content, may access the content by using the access information included in the information about the content, and may seamlessly reproduce the content being reproduced by the mobile device 400 by using the information about the portion where the content is being reproduced.

According to an embodiment, the mobile device 400 may directly transmit the information about the content being reproduced by the mobile device 400 to the electronic device 500 through a network.

Figure 10:
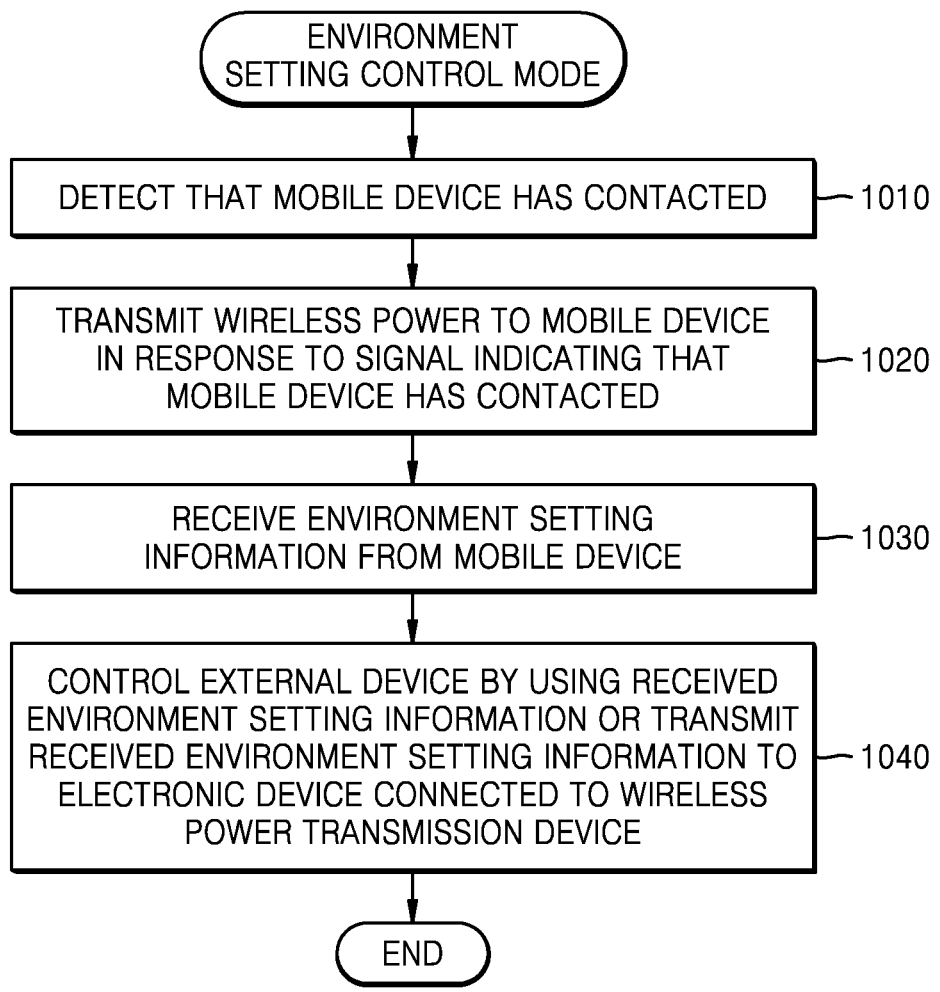
FIG. 10 is a flowchart illustrating an environment control operation performed by a wireless power transmission device according to an embodiment.
Figure 11:
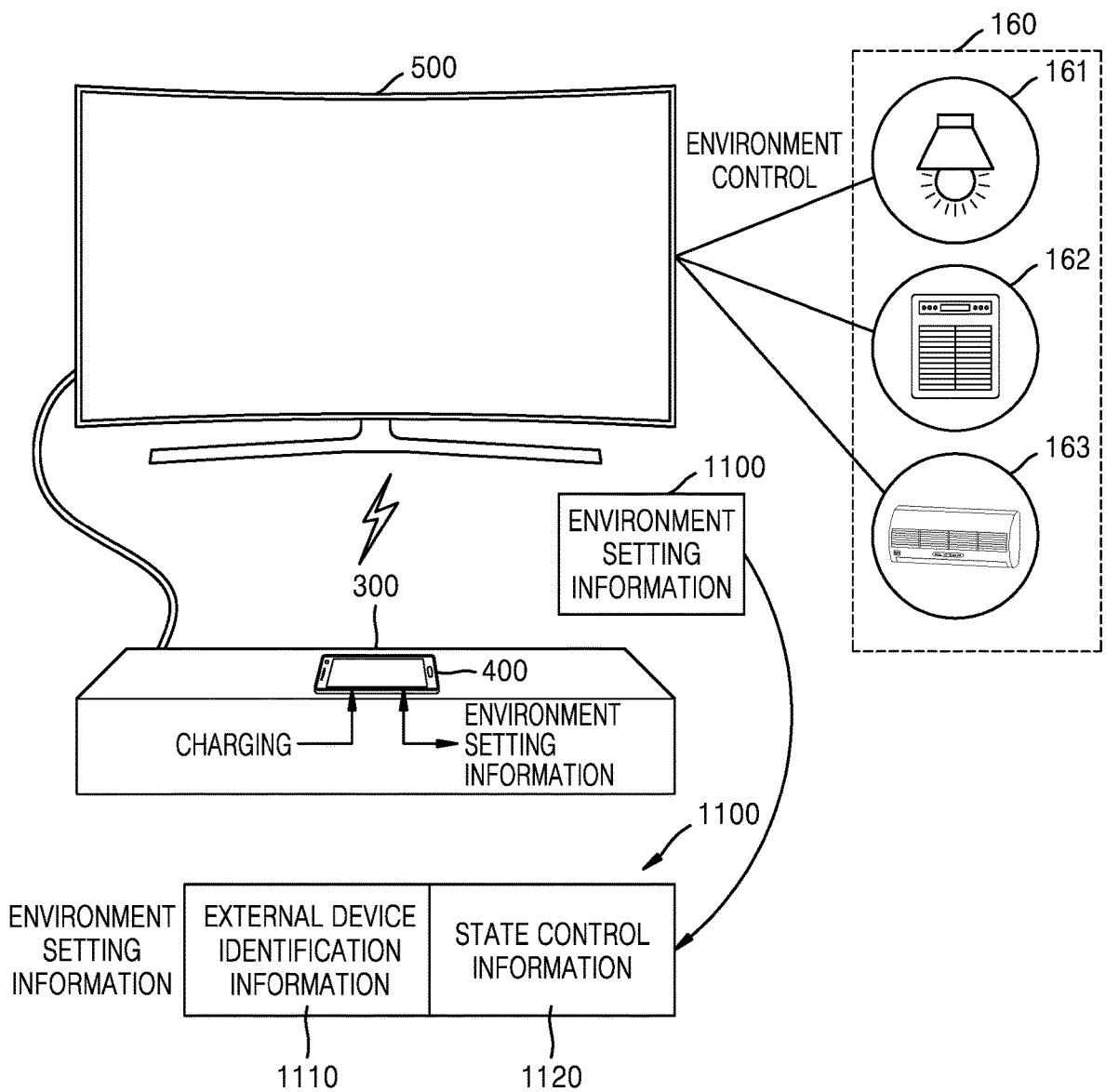
FIG. 11 is a reference diagram for explaining the environment control operation of FIG. 10.

FIG. 10 is a flowchart illustrating an environment control operation performed by a wireless power transmission device according to an embodiment. FIG. 11 is a reference diagram for explaining the environment control operation of FIG. 10.

The environment control operation performed by the wireless power transmission device will be explained with reference to FIGS. 10 and 11.

Referring to FIG. 10, in operation 1010, a wireless power transmission device detects that a mobile device is in contact with the wireless power transmission device.

In operation 1020, the wireless power transmission device transmits wireless power to the mobile device in response to a signal indicating that the mobile device is in contact with the wireless power transmission device.

In operation 1030, the wireless power transmission device receives environment setting information from the mobile device in response to the signal indicating that the mobile device is in contact with the wireless power transmission device.

The mobile device 400 may transmit environment setting information stored in the mobile device 400 through a power control message transmitted to the wireless power transmission device 300 or through data communication using a communicator to the wireless power transmission device 300. The wireless power transmission device 300 may receive the environment setting information from the mobile device 400.

Also, the wireless power transmission device 300 may transmit environment setting information stored in the wireless power transmission device 300 to the mobile device 400 through a power control message or data communication using a communicator. Accordingly, a user may receive setting information about a first environment from a first wireless power transmission device provided in a first environment by using the mobile device 400, and may control a second environment by using the setting information about the first environment by causing the mobile device 400 that stores the setting information about the first environment to contact a second wireless power transmission device provided in the second environment. For example, when the user is satisfied with a friend's home environment setting, the user may receive information about the friend's home environment setting through a mobile phone from a wireless power transmission device provided in the friend's home, and may control his/her home according to the friend's home environment setting by causing the mobile phone to contact a wireless power transmission device provided in his/her home.

Referring to FIG. 11, environment setting information 1100 may include external device identification information 1110 and state control information 1120. For example, when an external device 161 is a lighting device, the environment setting information 1100 may include an identifier indicating the lighting device and state control information indicating an on/off state of the lighting device. For example, when an external device 162 is a door, the environment setting information 1100 may include an identifier indicating the door and state control information indicating an open/closed state of the door. For example, when an external device 163 is an air conditioner, the environment setting information 1100 may include an identifier indicating the air conditioner, and state control information indicating an on/off state of the air conditioner and a set temperature of the air conditioner. For example, when the external device 163 is a TV, the environment setting information 1100 may include an identifier indicating the TV, information indicating an on/off state of the TV, and information that selects a specific channel of the TV. For example, when the external device 163 is an audio device, the environment setting information 1100 may include an identifier indicating the audio device, information indicating an on/off state of the audio device, and information about audio content to be reproduced by the audio device.

Accordingly, for example, when the user comes home, the user may adjust an indoor environment setting to a desired environment setting in which, for example, a temperature is set, a brightness is set, a channel is set while the TV is turned on, and background music is set while the audio device is turned on, by placing the mobile phone on the wireless power transmission device.

In operation 1040, the wireless power transmission device may control an external device by using the received environment setting information or may transmit the received environment setting information to an electronic device connected to the wireless power transmission device.

According to an embodiment, the wireless power transmission device 300 may directly control the external device 160 by using the environment setting information received from the mobile device 400. For example, when the environment setting information received from the mobile device 400 is <Lighting Device:on, Door:on, and Air Conditioner:on:25°>, the wireless power transmission device 300 may perform control through a wired or wireless network so that the lighting device 161 is turned on, the door 162 is opened, and the air conditioner 163 is turned on and is set to 25°.

According to an embodiment, the wireless power transmission device 300 may control the environment setting information received from the mobile device 400 to be transmitted to the electronic device 500 connected to the wireless power transmission device 300 by using the wired/wireless network and the electronic device 500 to set the external device 160 by using the received environment setting information. Upon receiving the environment setting information from the wireless power transmission device 300 according to a preset program, the electronic device 500 may operate to control the external device 160 by using the environment setting information.

According to an embodiment, the wireless power transmission device 300 may control the mobile device 400 to set the external device 160 by using the environment setting information stored in the mobile device 400. For example, the wireless power transmission device 300 may transmit an instruction to control an external device environment to the mobile device 400 by using a power signal or communication data in response to contact of the mobile device 400, and the mobile device 400 may control the external device 160 by using the environment setting information stored in the mobile device 400 in response to the instruction.

Figure 12:
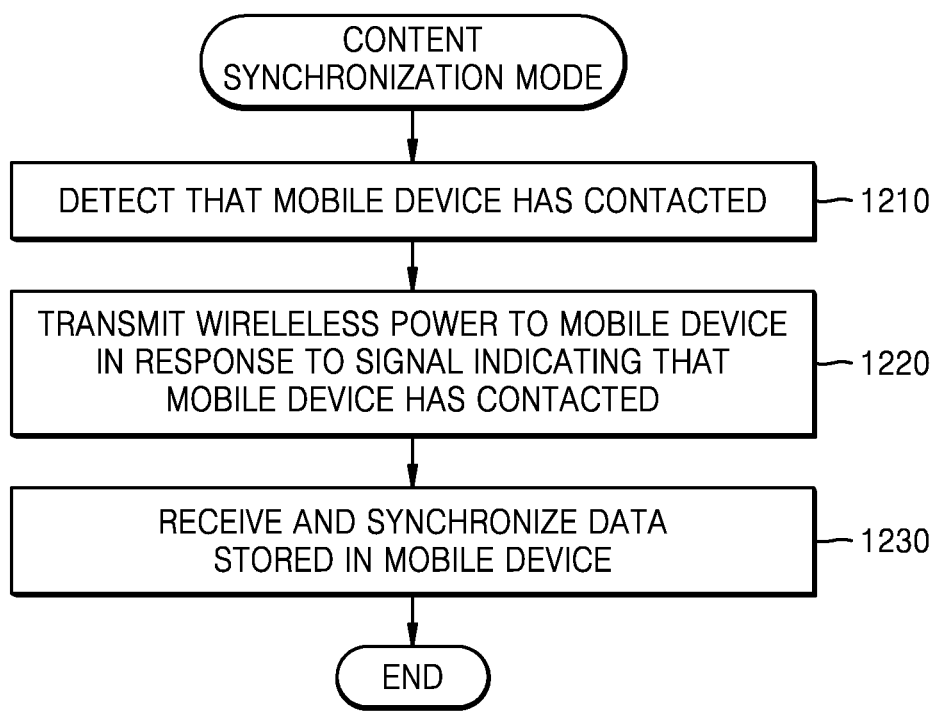
FIG. 12 is a flowchart illustrating a data synchronization operation performed by a wireless power transmission device according to an embodiment.
Figure 13:
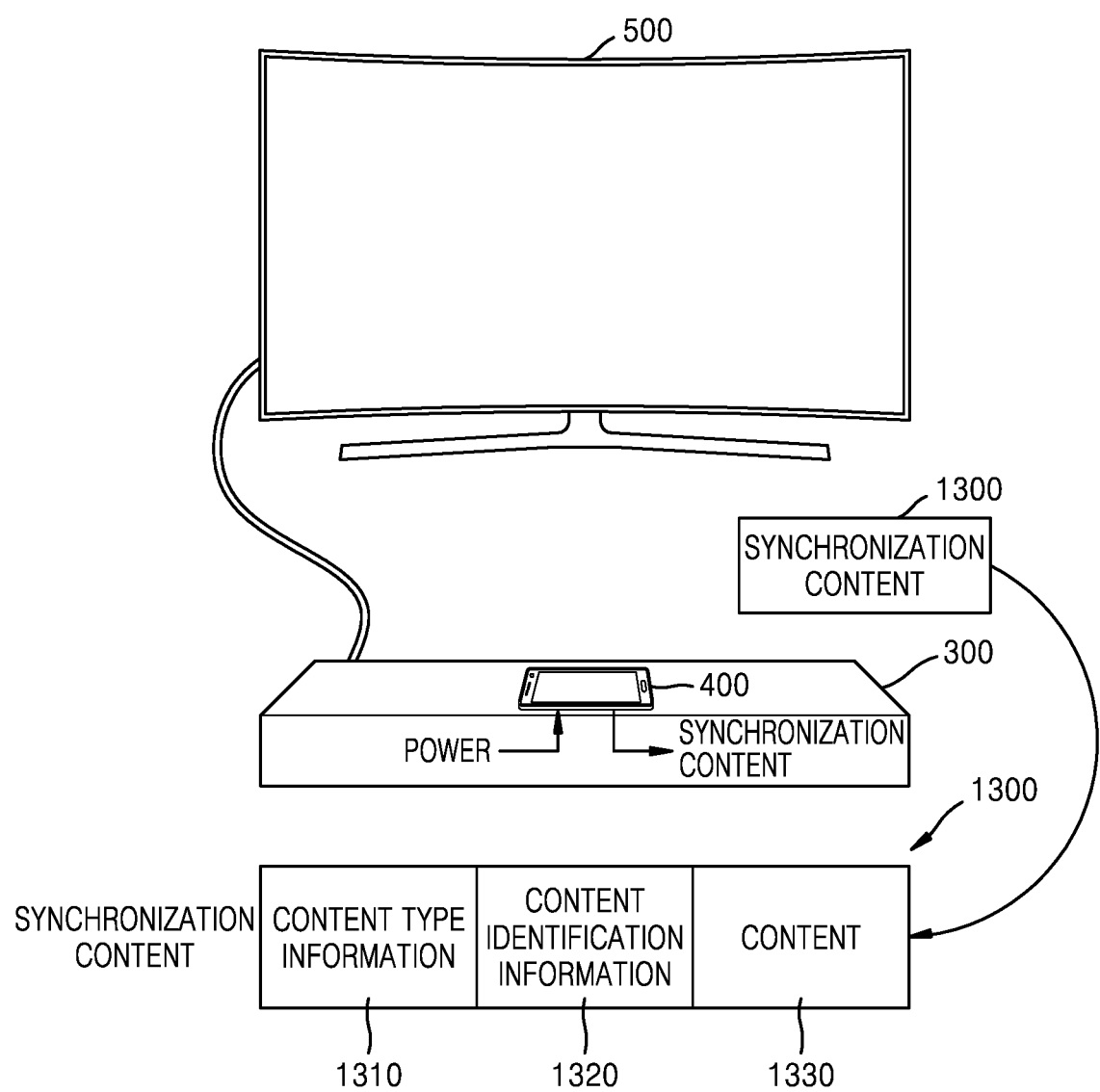
FIG. 13 is a reference diagram for explaining the data synchronization operation of FIG. 12.

FIG. 12 is a flowchart illustrating a data synchronization operation performed by a wireless power transmission device according to an embodiment. FIG. 13 is a reference diagram for explaining the data synchronization operation of FIG. 12.

The data synchronization operation will be described with reference to FIGS. 12 and 13.

Referring to FIG. 12, in operation 1210, a wireless power transmission device detects that a mobile device is in contact with the wireless power transmission device.

In operation 1220, the wireless power transmission device transmits wireless power to the mobile device in response to a signal indicating that the mobile device is in contact with the wireless power transmission device.

In operation 1230, the wireless power transmission device receives and synchronizes content data stored in the mobile device in response to the signal indicating that the mobile device is in contact with the wireless power transmission device.

The wireless power transmission device 300 may check whether content data stored in the mobile device 400 has been updated, added, or changed by using any of various methods. For example, the mobile device 400 may monitor whether data in a specific area of a memory has been updated, added, or changed, and when it is detected that the data stored in the memory has been changed as a monitoring result, the mobile device 400 may transmit information indicating that the data stored in the memory has been changed through a power control message transmitted to the wireless power transmission device 300 or may transmit the information to the wireless power transmission device 300 through data communication using a communicator. The wireless power transmission device 300 may receive the information indicating that the data has been changed from the mobile device 400 and may transmit a request for transmission of the data stored in the memory to the mobile device 400. When the mobile device 400 receives the request for transmission of the data stored in the memory from the wireless power transmission device 300, the mobile device 400 may transmit synchronization content to the wireless power transmission device 300.

Referring to FIG. 13, synchronization content 1300 may include content type information 1310 indicating a type of content to be synchronized, content identification information 1320 for identifying content, and content 1330. The content 1330 may include one or more from among still image data such as a photograph, moving picture data such as a video, and audio data such as music. The content type information 1310 may indicate whether the content 1330 is a video, an audio, or a still image.

When receiving the synchronization content 1300 from the mobile device 400, the wireless power transmission device 300 may store the content 1330 in a memory of the wireless power transmission device 300 according to a content type by using, for example, the content type information 1310. For example, when the content type is a still image such as a photograph, the wireless power transmission device 300 may store still image content received from the mobile device 400 in a memory space where content of a still image type is stored.

According to an embodiment, the wireless power transmission device 300 may transmit the synchronization content 1300 received from the mobile device 400 to the electronic device 500. The electronic device 500 may store the synchronization content 1300 received from the wireless power transmission device 300 in a memory. The electronic device 500 may also display the received synchronization content 1300 on a display.

Figure 14:
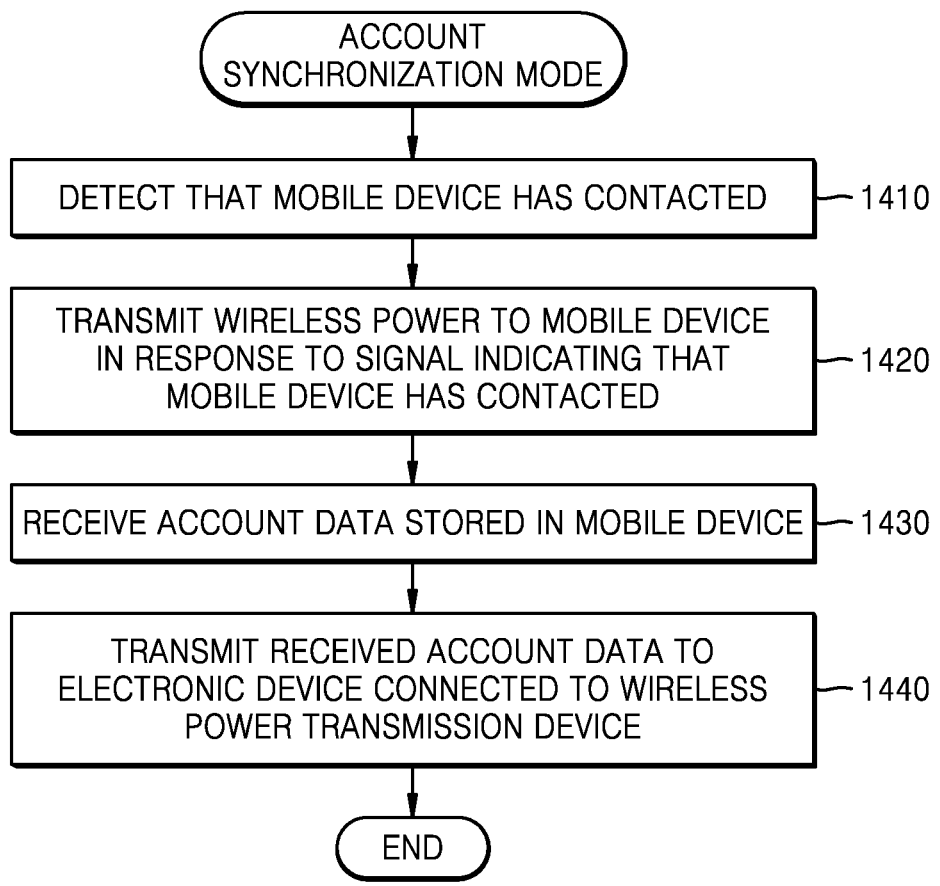
FIG. 14 is a flowchart illustrating an account synchronization operation performed by a wireless power transmission device according to an embodiment.
Figure 15:
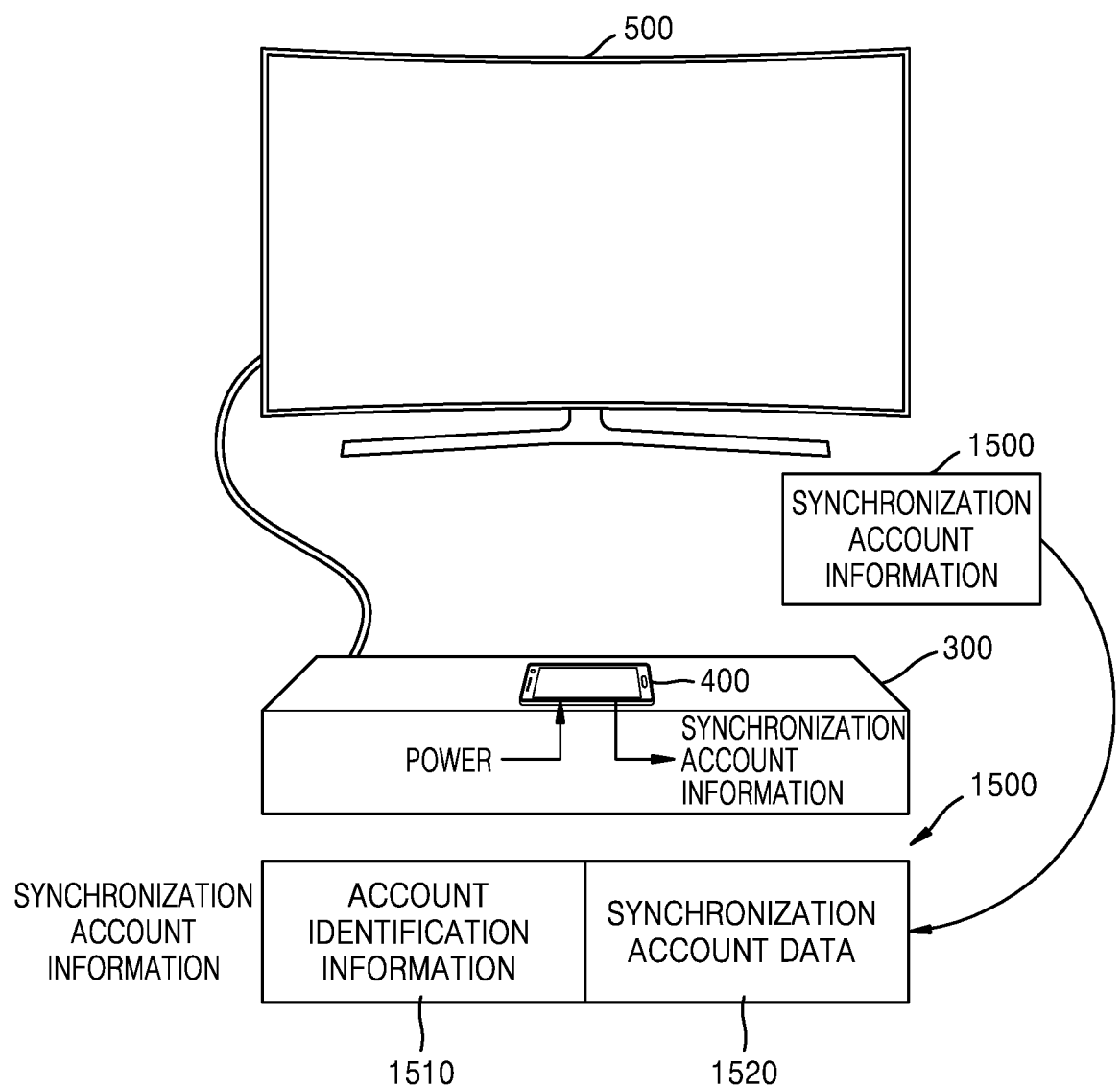
FIG. 15 is a reference diagram for explaining the account synchronization operation of FIG. 14.

According to such a content synchronization mode, without having to manually connect content newly stored in a user's mobile device to the wireless power transmission device 300 or the electronic device 500 and download data, the user may charge the mobile device 400 and may synchronize content of the mobile device 400 and the wireless power transmission device 300 or the electronic device 500 by simply placing the mobile device 400 on the wireless power transmission device 300. FIG. 14 is a flowchart illustrating an account synchronization operation performed by a wireless power transmission device according to an embodiment. FIG. 15 is a reference diagram for explaining the account synchronization operation of FIG. 14.

The account synchronization operation will be described with reference to FIGS. 14 and 15.

Referring to FIG. 14, in operation 1410, a wireless power transmission device detects that a mobile device is in contact with the wireless power transmission device.

In operation 1420, the wireless power transmission device transmits wireless power to the mobile device in response to a signal indicating that the mobile device is in contact with the wireless power transmission device.

In operation 1430, the wireless power transmission device receives account data stored in the mobile device. The wireless power transmission device 300 may check whether account data stored in the mobile device 400 has been generated, updated, added, or changed by using any of various methods. For example, the mobile device 400 may transmit the account data stored in a specific area of a memory of the mobile device 400 through a power control message transmitted to the wireless power transmission device 300 or may transmit the account data to the wireless power transmission device 300 through data communication using a communicator. Alternatively, for example, the wireless power transmission device 300 may transmit a command to transmit the account data through the communicator to the mobile device 400, and the mobile device 400 receiving the command may transmit the account data to the wireless power transmission device 300 through the communicator.

Referring to FIG. 15, synchronization account information 1500 received by the wireless power transmission device 300 from the mobile device 400 may include account identification information 1510 and synchronization account data 1520. The account identification information 1510 that is information for identifying an account of a user subscribing to a content provider or a service provider may include, for example, information for identifying a movie content provider and an account identifier of the user subscribing to the movie content provider. The synchronization account data 1520 may include personal information or payment information of the user, information input by the user to subscribe to a service of the movie content provider such as used language information, and information selected to receive the service such as service level information.

In operation 1440, the wireless power transmission device transmits the received account data to an electronic device connected to the wireless power transmission device.

According to an embodiment, the wireless power transmission device 300 may store the account data received from the mobile device 400 in a memory of the wireless power transmission device 300.

According to an embodiment, the wireless power transmission device 300 may transmit the account data received from the mobile device 400 to the electronic device 500 connected to the wireless power transmission device 300. The electronic device 500 receiving the account data from the wireless power transmission device 300 may provide a service of the content provider to the electronic device 500 by using the received account data. For example, the user may subscribe to a service of the movie content provider by using the mobile device 400, and may watch a movie from the mobile device 400. By simply placing the mobile device 400 on the wireless power transmission device 300, the wireless power transmission device 300 may synchronize the account data of the mobile device 400 with the electronic device 500, and thus the electronic device 500 may access the service of the movie content provider by using the account data stored in the mobile device 400 and may provide movie content to the user through a display of the electronic device 500.

Although the wireless power transmission device 300 may automatically perform various functions in response to contact between the wireless power transmission device 300 and the mobile device 400 as described above, the present disclosure is not limited thereto and a user interface for triggering various functions may be provided in response to contact between the wireless power transmission device 300 and the mobile device 400.

Also, the wireless power transmission device 300 may include a specific interface, and may be configured to select whether to automatically perform a function or to output a user interface when the mobile device 400 is in contact with the wireless power transmission device 300. For example, the wireless power transmission device 300 may include a specific button, and may be configured to automatically perform a function in response to contact of the mobile device 400 when the specific button is turned on and to output a user interface for selecting a function in response to contact of the mobile device 400 when the specific button is turned off. Although the specific button for enabling the selection may be provided in the wireless power transmission device 300, the present disclosure is not limited thereto and the specific button may be provided as an application in the mobile device 400 or the electronic device 500.

Various user interfaces that may be provided in response to contact between a mobile device and a wireless power transmission device will now be described with reference to FIGS. 16 through 25.

Figure 16:
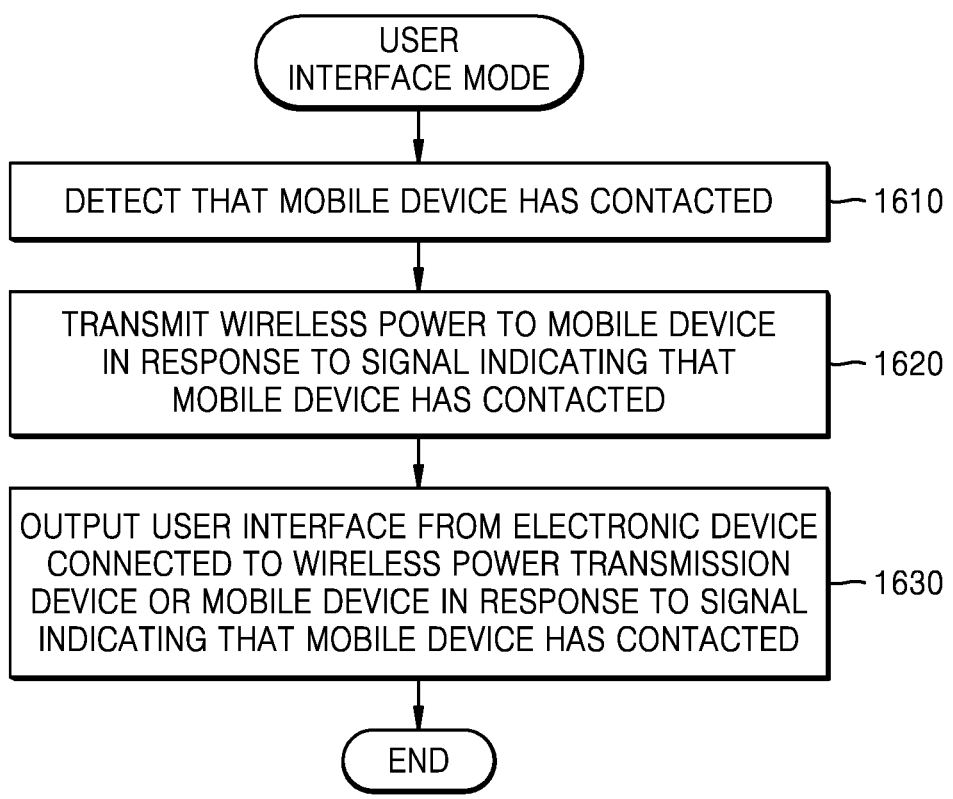
FIG. 16 is a flowchart illustrating another operation performed by a wireless power transmission device according to an embodiment.
Figure 17:
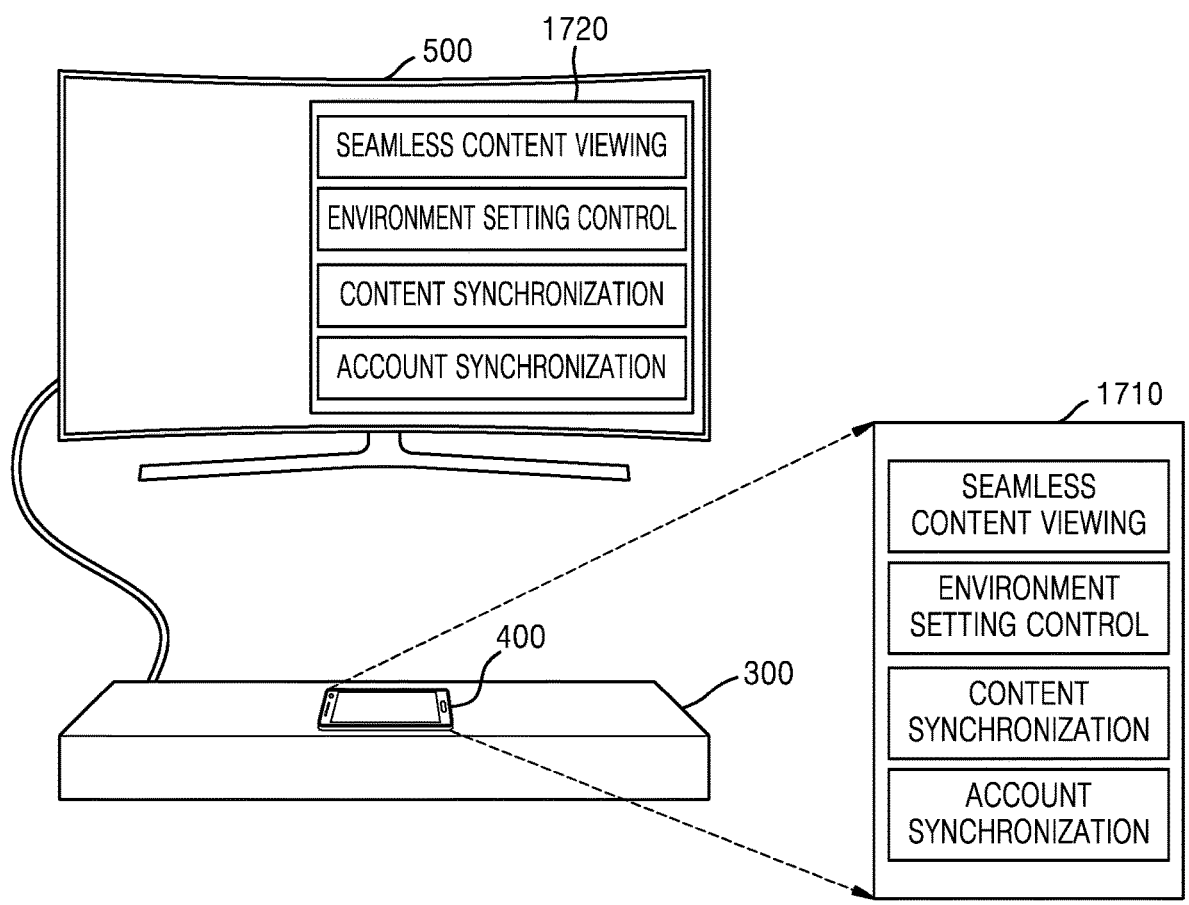
FIG. 17 is a diagram illustrating a user interface output from an electronic device or a mobile device according to an embodiment.

FIG. 16 is a flowchart illustrating another operation performed by a wireless power transmission device according to an embodiment. FIG. 17 is a diagram illustrating an example of a user interface output from an electronic device or a mobile device according to an embodiment.

Referring to FIG. 16, in operation 1610, a wireless power transmission device detects that a mobile device is in contact with the wireless power transmission device.

In operation 1620, the wireless power transmission device transmits wireless power to the mobile device in response to a signal indicating that the mobile device is in contact with the wireless power transmission device.

In operation 1630, the wireless power transmission device may control a user interface to be output in response to the signal indicating that the mobile device is in contact with the wireless power transmission device.

According to an embodiment, the wireless power transmission device 300 may control the mobile device 400 to output a user interface in response to a signal indicating that the mobile device 400 is in contact with the wireless power transmission device 300. For example, the wireless power transmission device 300 may transmit, to the mobile device 400, a command to output the user interface in response to the signal indicating that the mobile device 400 is in contact with the wireless power transmission device 300.

According to an embodiment, the mobile device 400 may output the user interface by itself in response to the signal indicating that the mobile device 400 is in contact with the wireless power transmission device 300.

Referring to FIG. 17, when the mobile device 400 is in contact with the wireless power transmission device 300, the wireless power transmission device 300 transmits wireless power to the mobile device 400 while the mobile device 400 outputs a user interface 1710. The user interface 1710 for selecting a function to be performed while the wireless power transmission device 300 transmits the wireless power to the mobile device 400 may include at least one from among a seamless content viewing menu, an environment control setting menu, a content synchronization menu, and an account synchronization menu. A user may select one or more menus of the user interface 1710 output on a display of the mobile device 400 and cause functions corresponding to the one or more menus to be performed.

According to an embodiment, the wireless power transmission device 300 may control the electronic device 500 to output a user interface in response to the signal indicating that the mobile device 400 is in contact with the wireless power transmission device 300. The wireless power transmission device 300 may transmit, to the electronic device 500, a command to output the user interface in response to the signal indicating that the mobile device 400 is in contact with the wireless power transmission device 300.

Referring to FIG. 17, a user interface 1720 output from the electronic device 500 may include at least one from among a seamless content viewing menu, an environment control setting menu, a content synchronization menu, and an account synchronization menu, like the user interface 1710 output from the mobile device 400. The user may select one or more menus of the user interface 1720 output on a display of the electronic device 500 and cause functions corresponding to the one or more menus to be performed.

Figure 18:
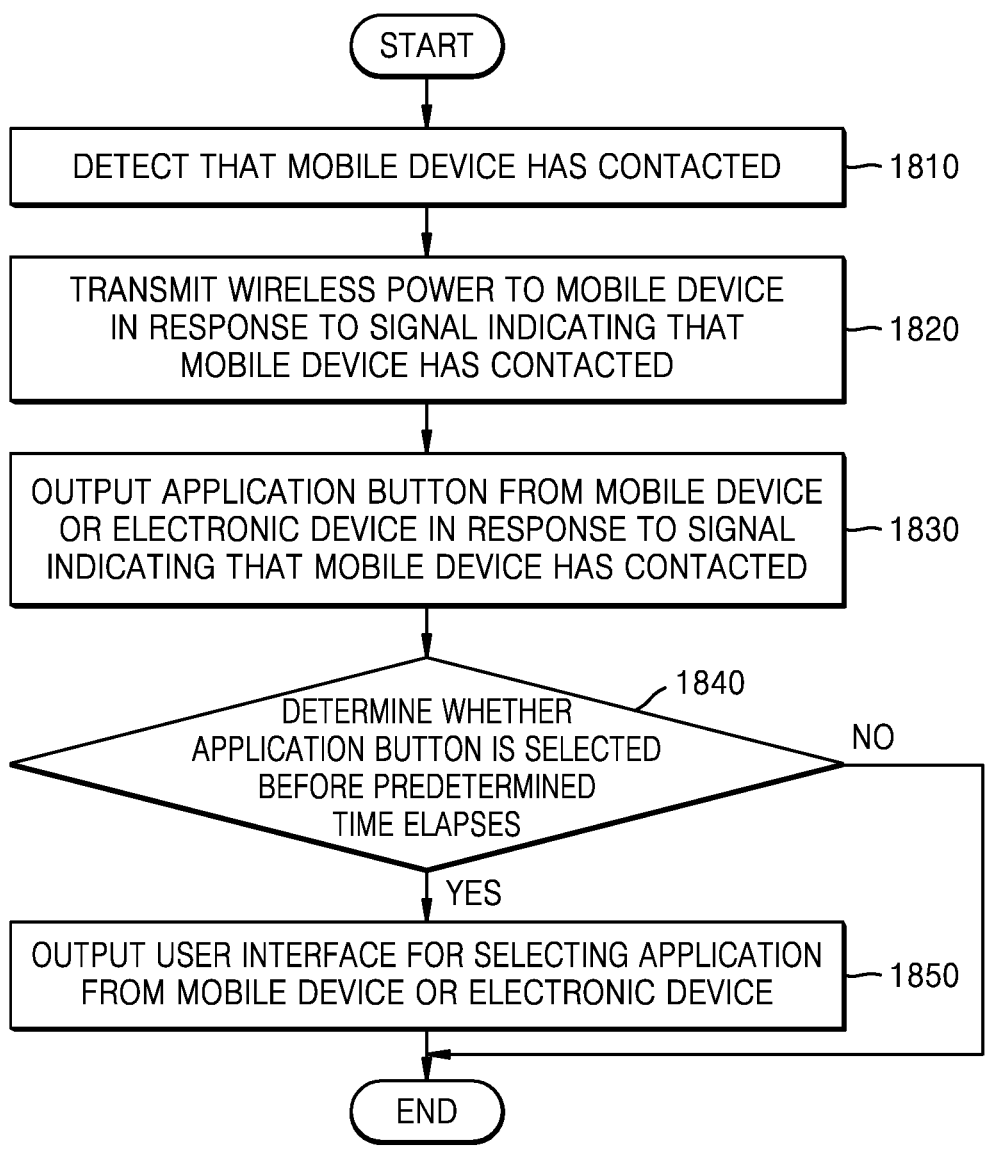
FIG. 18 is a flowchart illustrating another operation of a wireless power transmission device according to an embodiment.
Figure 19:
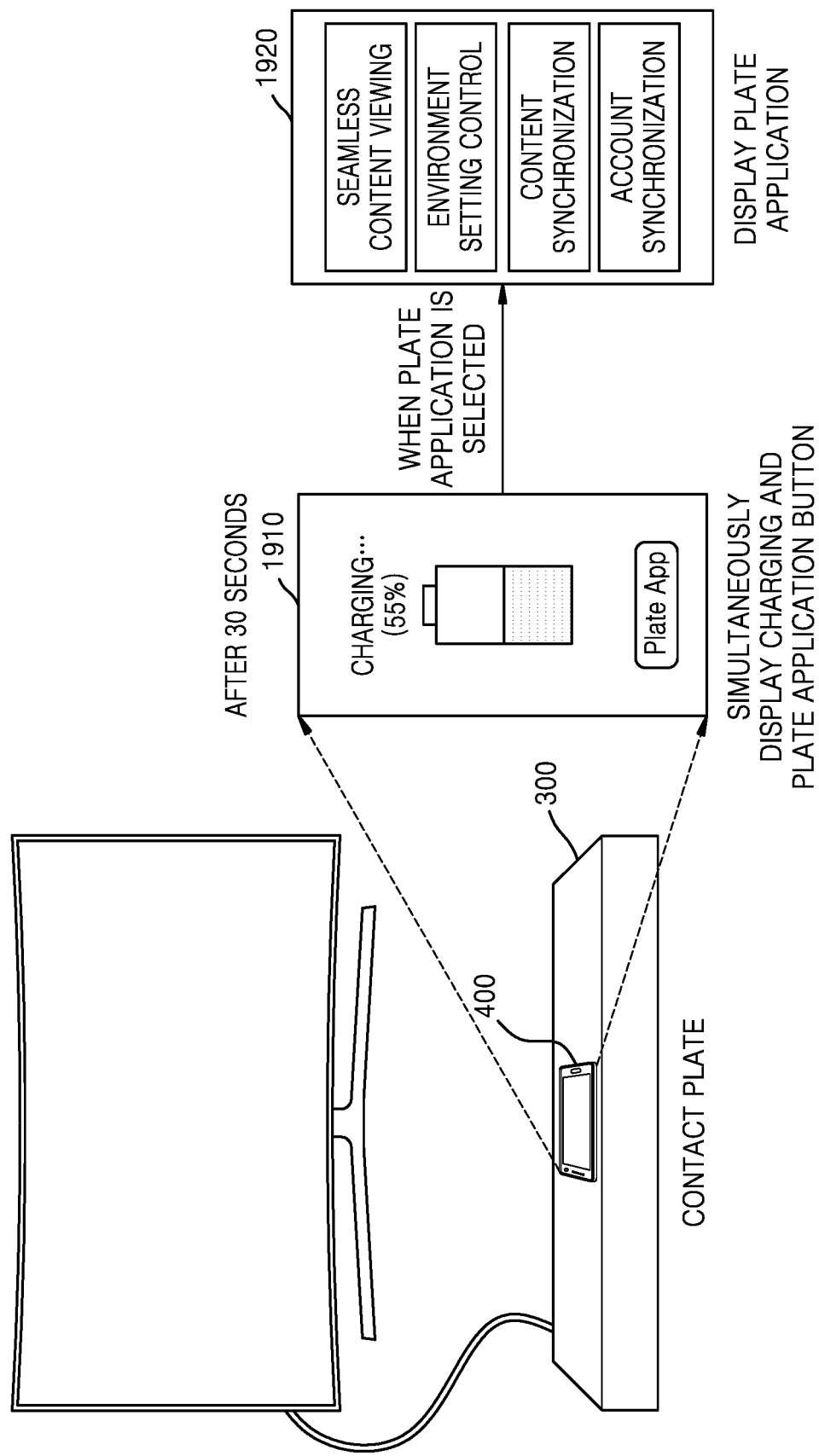
FIG. 19 is a reference diagram for explaining an operation by which a mobile device that is in contact with a wireless power transmission device outputs a user interface, according to an embodiment.
Figure 20:
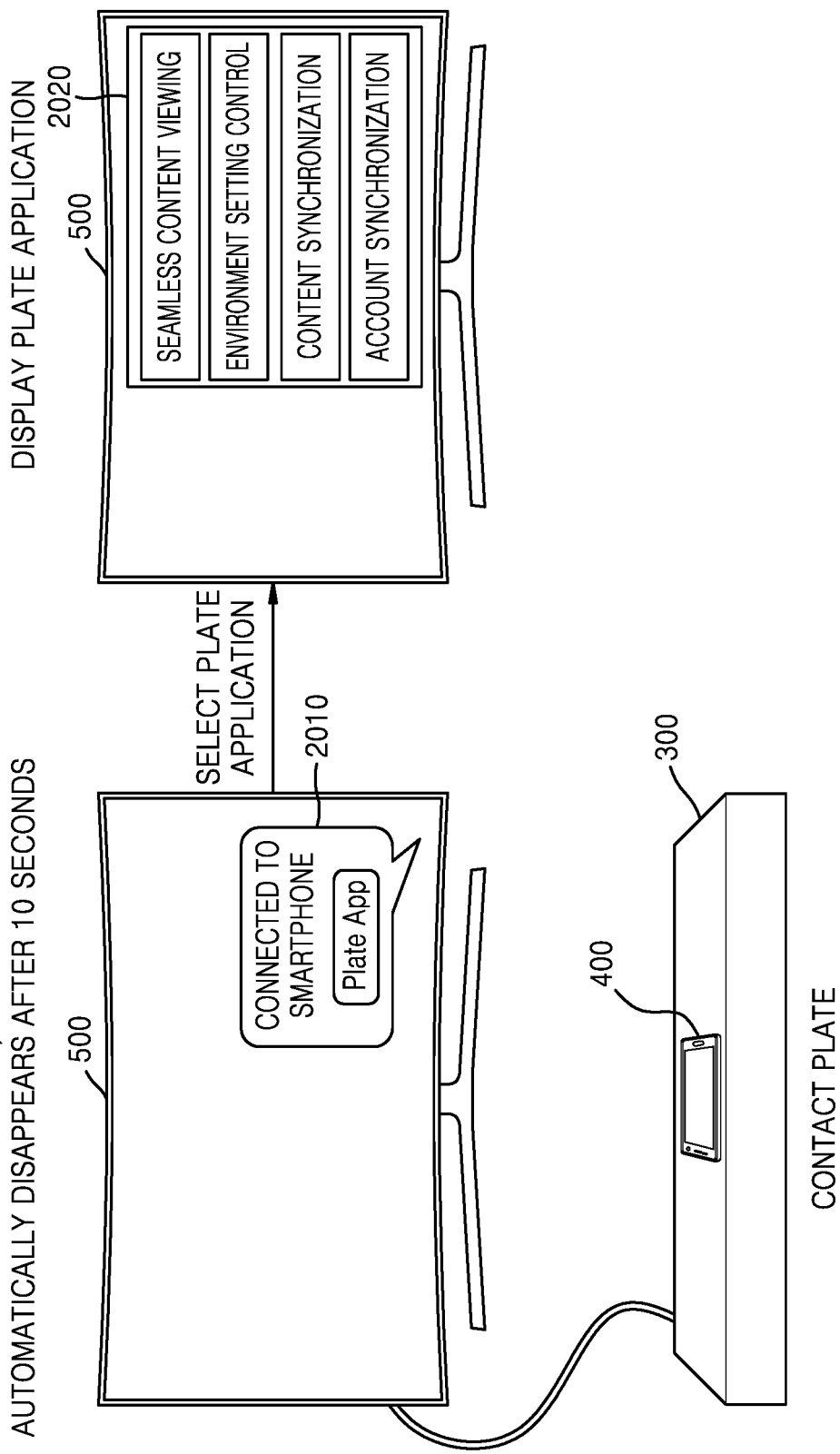
FIG. 20 is a reference diagram for explaining an operation by which an electronic device outputs a user interface, according to an embodiment.

FIG. 18 is a flowchart illustrating another operation performed by a wireless power transmission device according to an embodiment. FIG. 19 is a reference diagram for explaining an operation by which a mobile device that is in contact with a wireless power transmission device outputs a user interface according to an embodiment. FIG. 20 is a reference diagram for explaining an operation by which an electronic device outputs a user interface according to an embodiment.

Referring to FIG. 18, in operation 1810, a wireless power transmission device detects that a mobile device is in contact with the wireless power transmission device.

In operation 1820, the wireless power transmission device transmits wireless power to the mobile device in response to a signal indicating that the mobile device is in contact with the wireless power transmission device.

In operation 1830, the mobile device or an electronic device outputs an application button in response to the signal indicating that the mobile device is in contact with the wireless power transmission device.

Referring to FIG. 19, the mobile device 400 may output a user interface 1910, and the user interface 1910 includes an application button 1914. The application button 1914 indicates a menu or an item that may receive a user input that triggers execution of an application. The mobile device 400 may display the application button 1914 on the user interface 1910 and may further display information 1912 indicating a charge state of the mobile device 400.

Referring to FIG. 20, the electronic device 500 may output a user interface 2010, and the user interface 2010 includes an application button 2014. The electronic device 500 may display the application button 2014 on the user interface 2010 and may further display a message 2012 saying <Smartphone has been connected>.

In operation 1840, the electronic device or the mobile device determines whether the application button is selected before a predetermined time elapses.

When it is determined that the application button is selected before the predetermined time elapses, in operation 1850, the electronic device or the mobile device outputs a user interface for selecting an application.

Referring to FIG. 19, the mobile device 400 may output a user interface 1920 for selecting an application when the application button 1914 is selected. A user may select a menu displayed on the user interface 1920 by using his/her finer or an input unit.

Referring to FIG. 20, the electronic device 500 may output a user interface 2020 for selecting an application when the application button 2014 is selected. The user may select a menu displayed on the user interface 2020 by using a voice recognition function or a remote control device.

The mobile device 400 or the electronic device 500 terminates an operation when it is not determined that the application button is selected before a predetermined time elapses. Accordingly, the user interface 1910 or the user interface 2010 may disappear.

Figure 21:
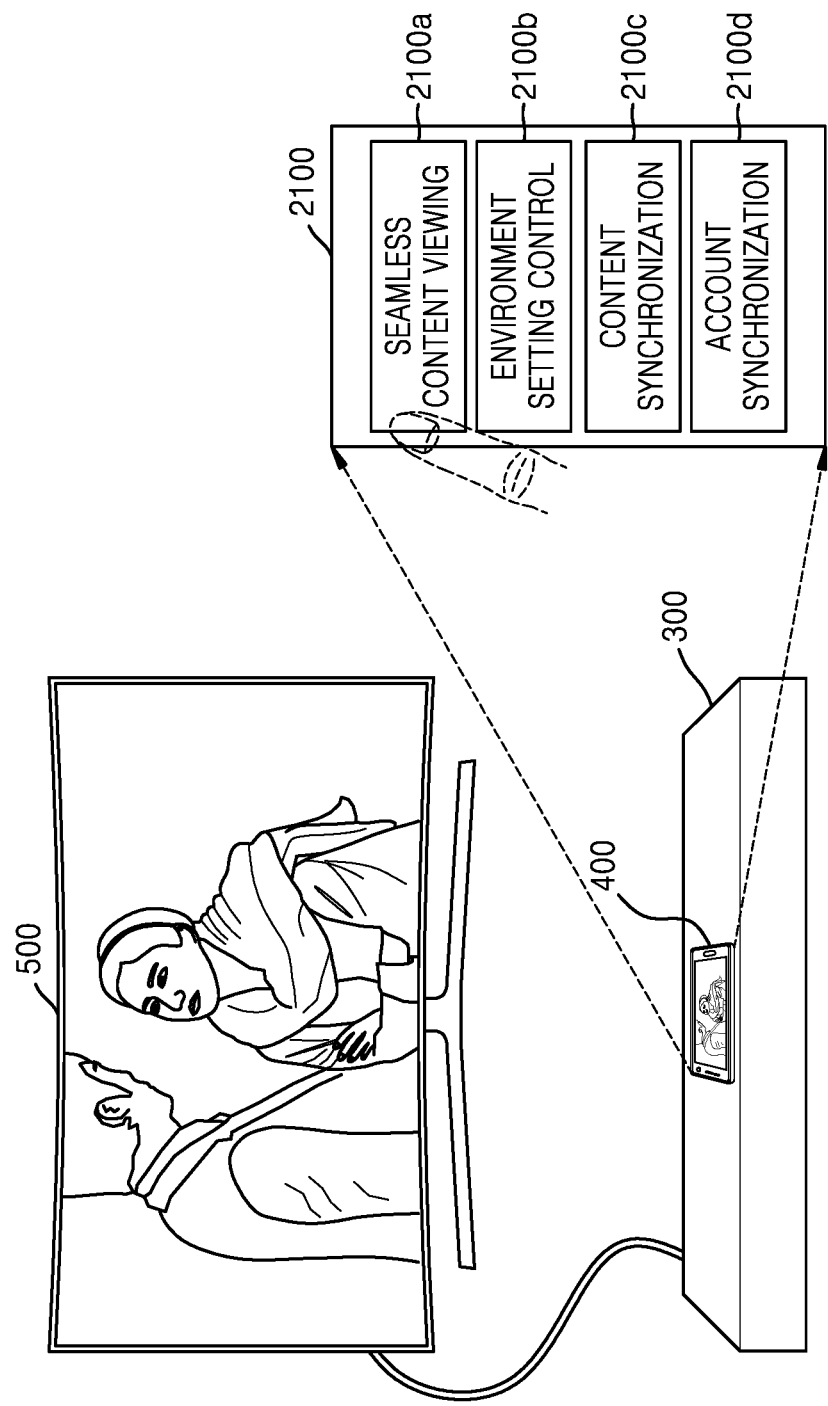
FIG. 21 is a reference diagram for explaining an operation performed according to a seamless content viewing menu on a user interface output from a mobile device, according to an embodiment.

FIG. 21 is a reference diagram for explaining an operation performed according to a seamless content viewing menu on a user interface output from a mobile device according to an embodiment.

Referring to FIG. 21, a user interface 2100 output from the mobile device 400 includes a seamless content viewing menu 2100a, an environment setting control menu 2100b, a content synchronization menu 2100c, and an account synchronization menu 2100d. When content is being reproduced by the mobile device 400, the user interface 2100 output from the mobile device 400 may be displayed on a layer over the reproduced content. In this case, the user interface 2100 may be output on a transparent layer or in a minimum size so as not to interfere with watching the content output from the mobile device 400.

When a user selects the seamless content viewing menu 2100a, the mobile device 400 may transmit the content being reproduced by the mobile device 400 or information about the content to the wireless power transmission device 300, as well as transmitting a signal indicating that the mobile device 400 selects the seamless content viewing menu 2100a to the wireless power transmission device 300.

The wireless power transmission device 300 may transmit the content or the information about the content received from the mobile device 400 to the electronic device 500. When receiving the content, the electronic device 500 may seamlessly reproduce the received content. When receiving the information about the content, the electronic device 500 may access the content by using the information about the content and may reproduce the accessed content.

Figure 22:
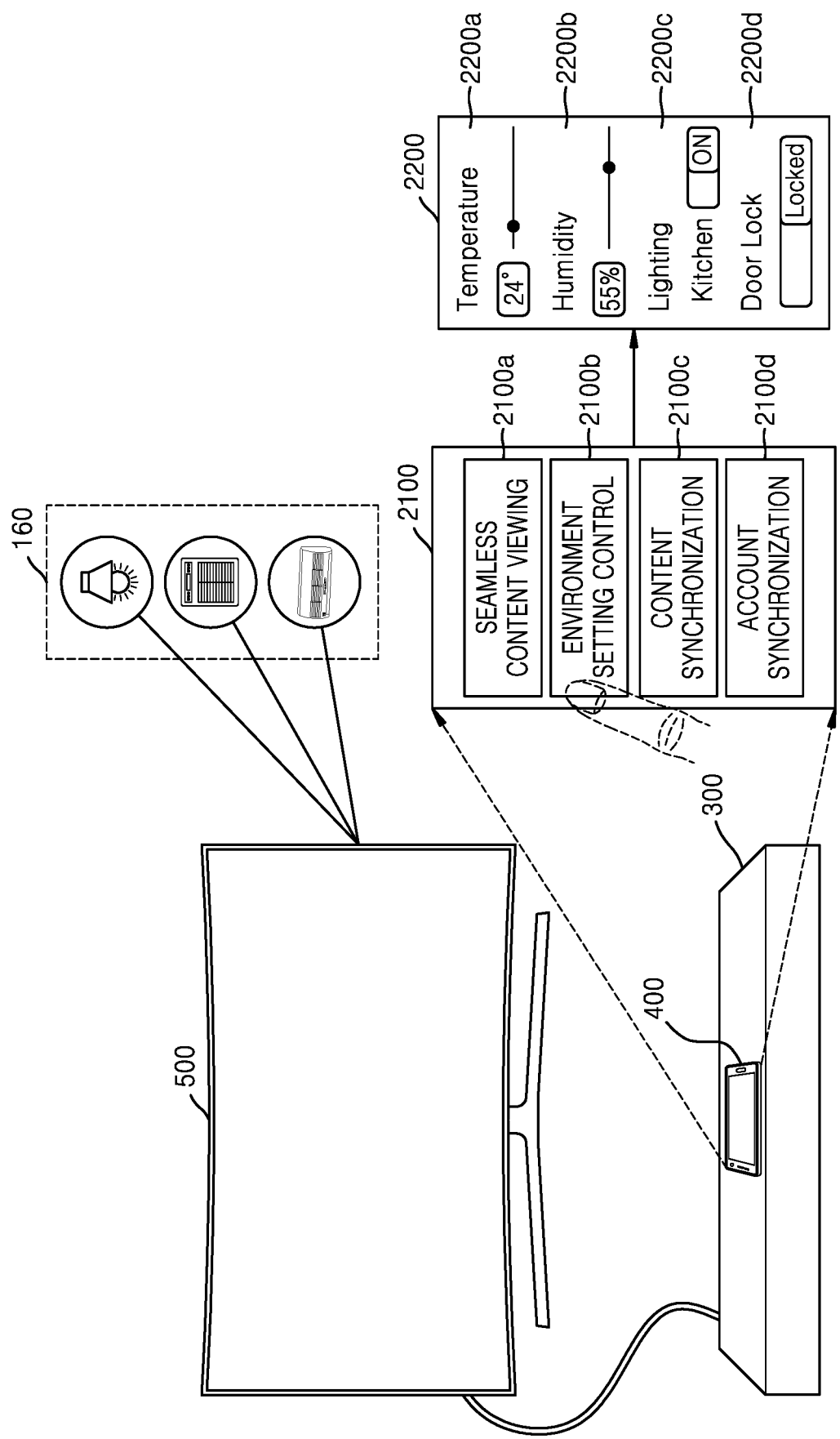
FIG. 22 is a reference diagram for explaining an operation performed according to an environment setting control menu on a user interface output from a mobile device, according to an embodiment.

FIG. 22 is a reference diagram for explaining an operation performed according to an environment setting control menu on a user interface output from a mobile device according to an embodiment.

Referring to FIG. 22, when a user selects the environment setting control menu 2100b on the user interface 2100 output from the mobile device 400, the mobile device 400 may transmit environment setting information stored in the mobile device 400 to the wireless power transmission device 300, as well as transmitting a signal indicating that the environment setting control menu 2100b is selected to the wireless power transmission device 300. The wireless power transmission device 300 may directly control an external device by using the environment setting information received from the mobile device 400, or may transmit the environment setting information to the electronic device 500 and may allow the electronic device 500 to control the external device.

According to an embodiment, the mobile device 400 may output a user interface 2200 that may change an environment setting in response to the signal indicating that the environment setting control menu 2100b is selected. The user interface 2200 may include, for example, a menu 2200*a* for adjusting an indoor temperature, a menu 2200*b* for adjusting an indoor humidity, a menu 2200*c* for setting an on/off state of a lighting device, and a menu 2200*d* for setting a lock/unlock state of a door lock.

When the user changes a setting on the user interface 2200, the mobile device 400 may transmit changed environment setting information to the wireless power transmission device 300.

According to an embodiment, the user may select a direction in which environment setting information is transmitted by using the environment setting control menu 2100*b*. Environment setting information stored in the mobile device 400 may be transmitted to the wireless power transmission device 300 according to the users selection. Alternatively, environment setting information stored in the wireless power transmission device 300 may be transmitted to the mobile device 400 according to the user's selection.

Figure 23:
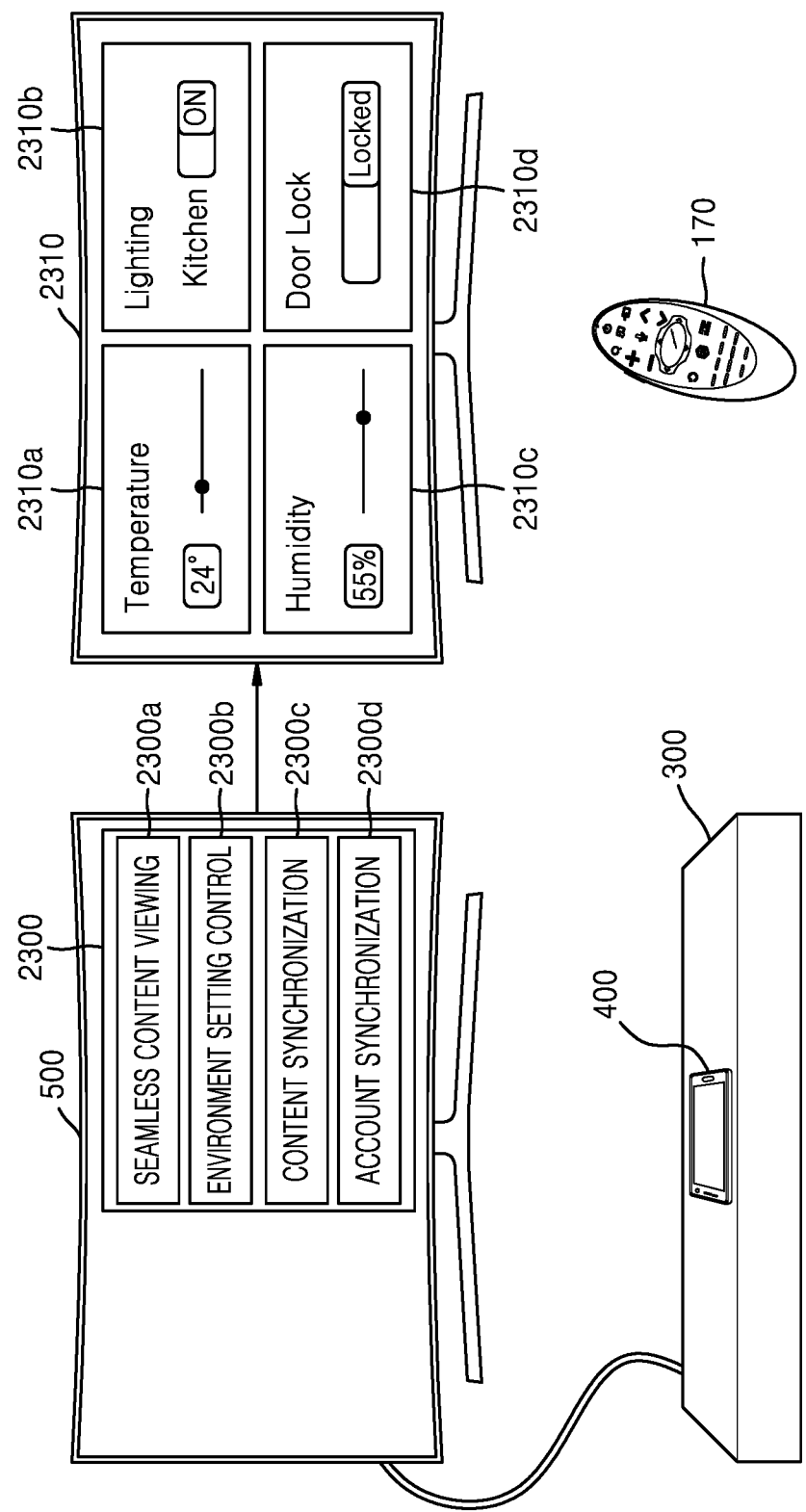
FIG. 23 is a reference diagram for explaining an operation performed according to an environment setting control menu on a user interface output from an electronic device, according to an embodiment.

FIG. 23 is a reference diagram for explaining an operation performed according to an environment setting control menu on a user interface output from an electronic device according to an embodiment.

Referring to FIG. 23, the electronic device 500 outputs a user interface 2300. When an environment setting control menu 2300*b* is selected by a user by using a remote control device 170, from the user interface 2300, the electronic device 500 transmits a signal indicating that the environment setting control menu 2300*b* is selected to the wireless power transmission device 300. In response to the signal, the wireless power transmission device 300 may receive environment setting information stored in the mobile device 400 and may transmit the environment setting information to the electronic device 500. The electronic device 500 may control an external device by using the received environment setting information.

According to an embodiment, in response to the signal indicating that the environment setting control menu 2300*b* is selected, the electronic device 500 may output a user interface 2310 that may change an environment setting. The user interface 2310 may include, for example, a menu 2310*a* for adjusting an indoor temperature, a menu 2310*c* for adjusting an indoor humidity, a menu 2310*b* for setting an on/off state of a lighting device, and a menu 2310*d* for setting a lock/unlock state of a door lock.

When the user changes a setting on the user interface 2310, the electronic device 500 may control the external device by using changed environment setting information.

Figure 24:
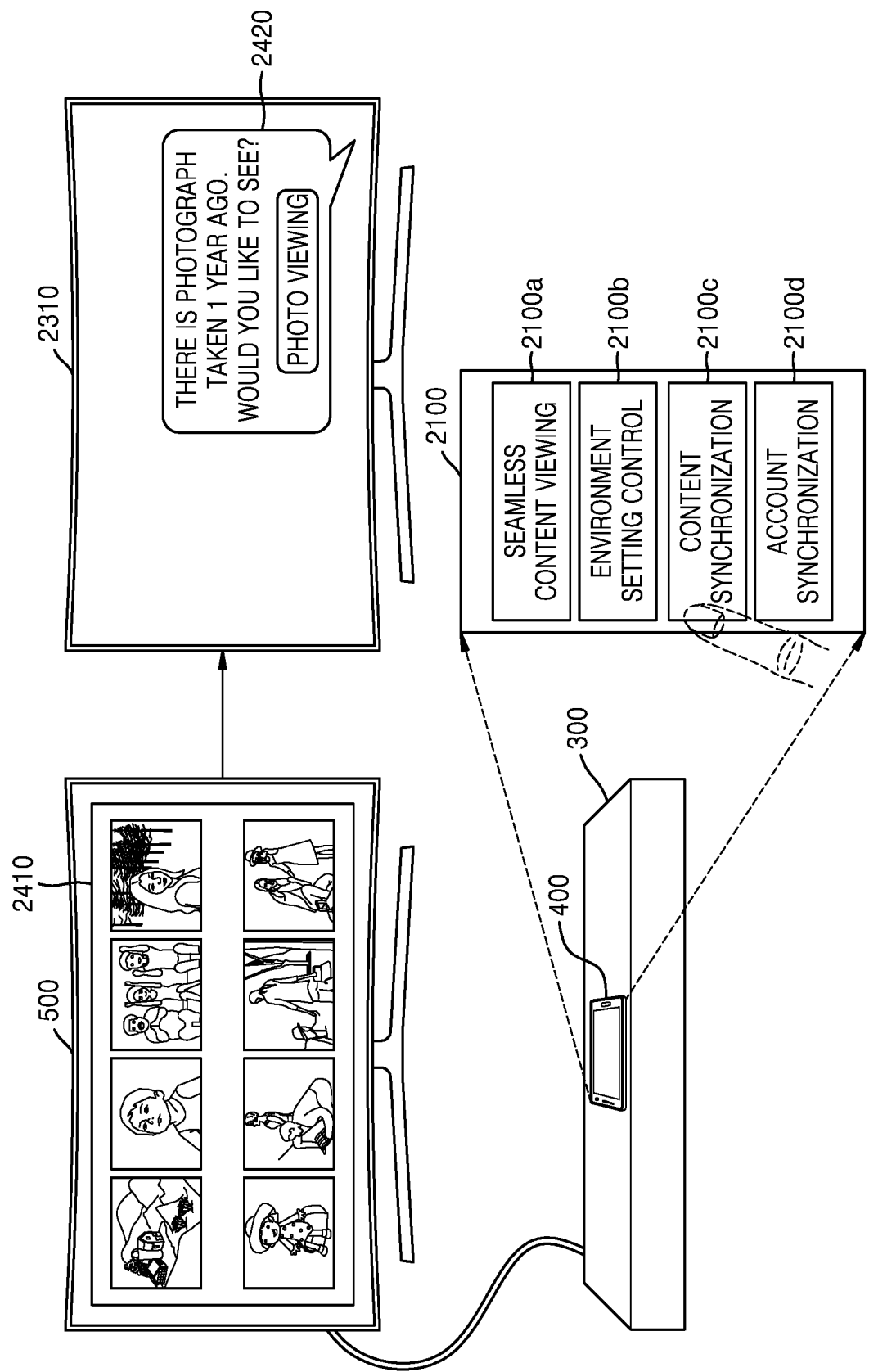
FIG. 24 is a reference diagram for explaining an operation performed according to a photograph synchronization menu on a user interface output from a mobile device, according to an embodiment.

FIG. 24 is a reference diagram for explaining an operation performed according to a photograph synchronization menu on a user interface output from a mobile device according to an embodiment.

Referring to FIG. 24, when a user selects the content synchronization menu 2100*c* on the user interface 2100 output from the mobile device 400, the mobile device 400 may transmit content data stored in the mobile device 400 to the wireless power transmission device 300, as well as transmitting a signal indicating that the content synchronization menu 2100*c* is selected to the wireless power transmission device 300. The wireless power transmission device 300 may synchronize data of the mobile device 400 with data of the wireless power transmission device 300 by using the content data received from the mobile device 400 or may transmit the received content data to the electronic device 500. The electronic device 500 may store or reproduce the content data received from the wireless power transmission device 300. The content data may include a photo gallery and the electronic device 500 may output the content data as shown in FIG. 24. The electronic device 500 may output a message 2420 saying <There is a photograph taken one year ago. Would you like to see?>, and when the user selects a <Photo Viewing> button, the electronic device 500 may search for the photograph taken one year ago from among photographs and may output the photograph on a display.

Figure 25:
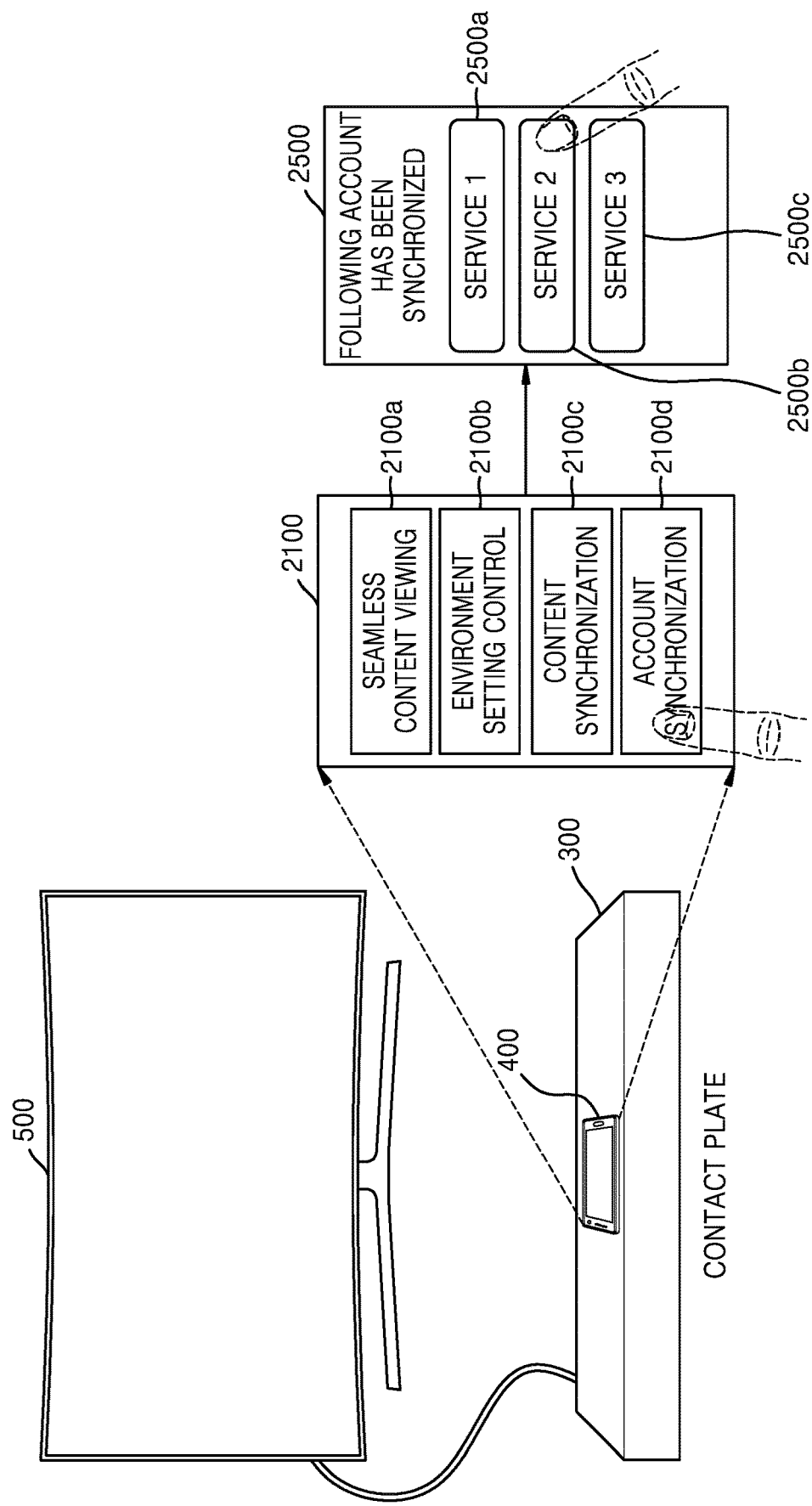
FIG. 25 is a reference diagram for explaining an operation performed according to an account synchronization menu on a user interface output from a mobile device, according to an embodiment.

FIG. 25 is a reference diagram for explaining an operation performed according to an account synchronization menu on a user interface output from a mobile device according to an embodiment.

Referring to FIG. 25, when a user selects the account synchronization menu 2100*d* on the user interface 2100 output from the mobile device 400, the mobile device 400 may transmit account data stored in the mobile device 400 to the wireless power transmission device 300, as well as transmitting a signal indicating that the account synchronization menu 2100*d* is selected to the wireless power transmission device 300. The account data may include data about one or more accounts. The wireless power transmission device 300 receiving the account data may transmit the account data to the electronic device 500. The electronic device 500 may provide a content service by using the received account data.

According to an embodiment, the mobile device 400 may output a user interface 2500 that may select account data to be synchronized from among a plurality of pieces of account data in response to the user selecting the account synchronization menu 2100*d*. Referring to FIG. 25, the user interface 2500 may include a service 1 synchronization menu 2500*a*, a service 2 synchronization menu 2500*b*, and a service 3 synchronization menu 2500*c*. The mobile device 400 may transmit the account data selected by the user on the user interface 2500 to the wireless power transmission device 300 in order to synchronize the account data.

Figure 26:
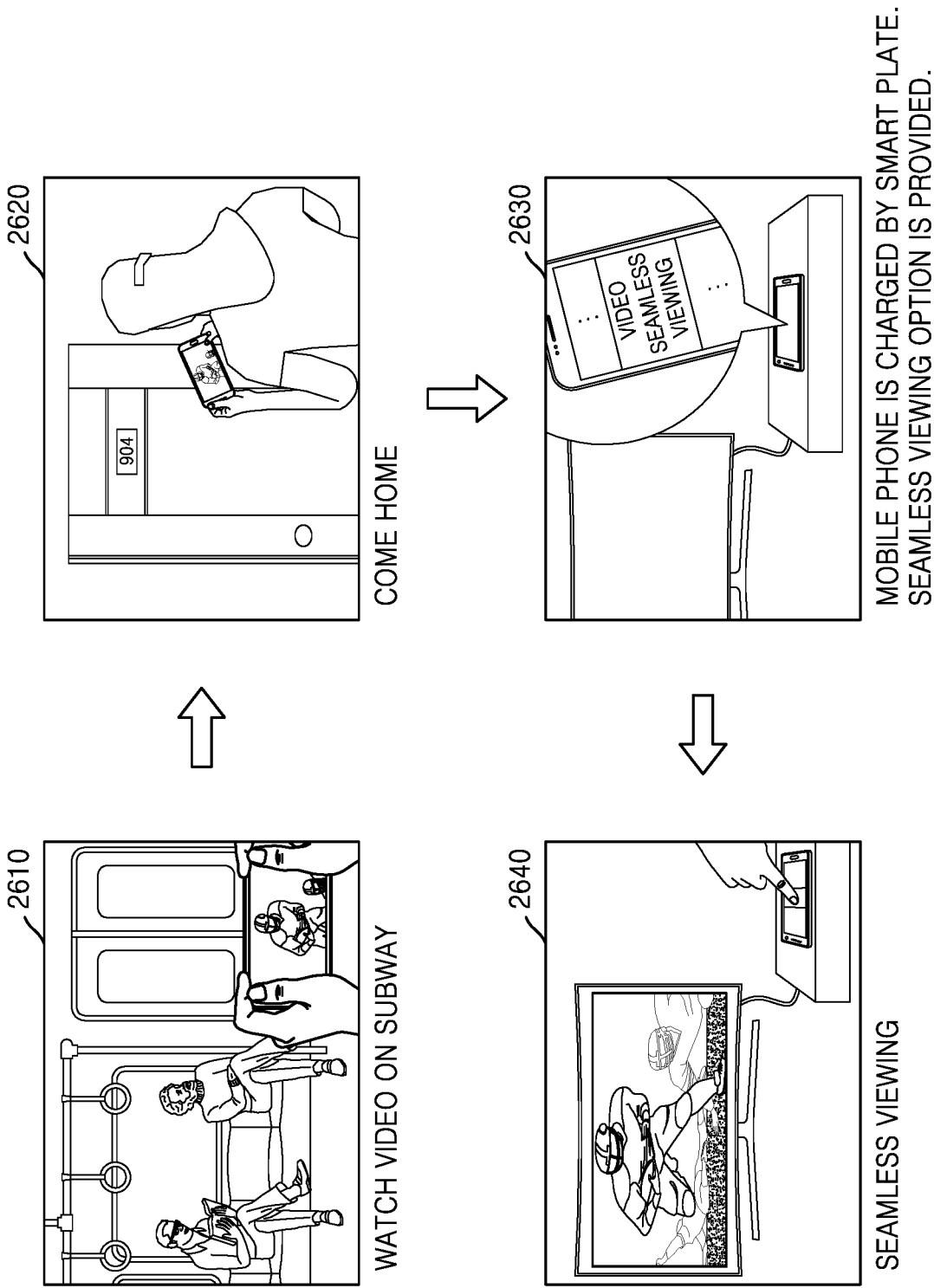
FIG. 26 is a reference diagram for explaining a usage example of a seamless content viewing mode according to an embodiment.

FIG. 26 is a reference diagram for explaining a usage example of a seamless content viewing mode according to an embodiment.

An image 2610 of FIG. 26 shows that a user watches a video through her mobile phone in an outdoor environment. For example, the user may watch the video on the subway on her way home.

An image 2620 shows that the user comes home while continuously watching the video. For example, the user who is watching a game during a World Cup season, a baseball season, or a soccer season may want to watch the video seamlessly.

An image 2630 shows that the user who comes home places her mobile phone on a smart plate that is a wireless power transmission device. Once the mobile phone is placed on the smart plate, the smart plate may provide wireless charging to the mobile phone, and when video content is being reproduced by the mobile phone, the smart plate may receive the video content being reproduced from the mobile phone and may transmit the video content to a TV in the room. The TV receives the video content being reproduced by the mobile phone from the smart plate and reproduces the video content on a display. In this case, the video content being reproduced by the mobile phone may be automatically reproduced by the TV, or when a video seamless viewing option is provided by the mobile phone and the user selects the seamless viewing option, the video content being reproduced by the mobile device may be reproduced by the TV.

An image 2640 shows that, when the user selects the seamless viewing mode output from the mobile phone, the video content being reproduced by the mobile phone is reproduced by the TV. Since the seamless viewing option is provided according to embodiments, the user may seamlessly watch the video, which is being watched through the mobile phone in the outdoor environment, on a large screen of the TV in the room by simply placing the mobile phone on the smart plate even in the room.

Figure 27:
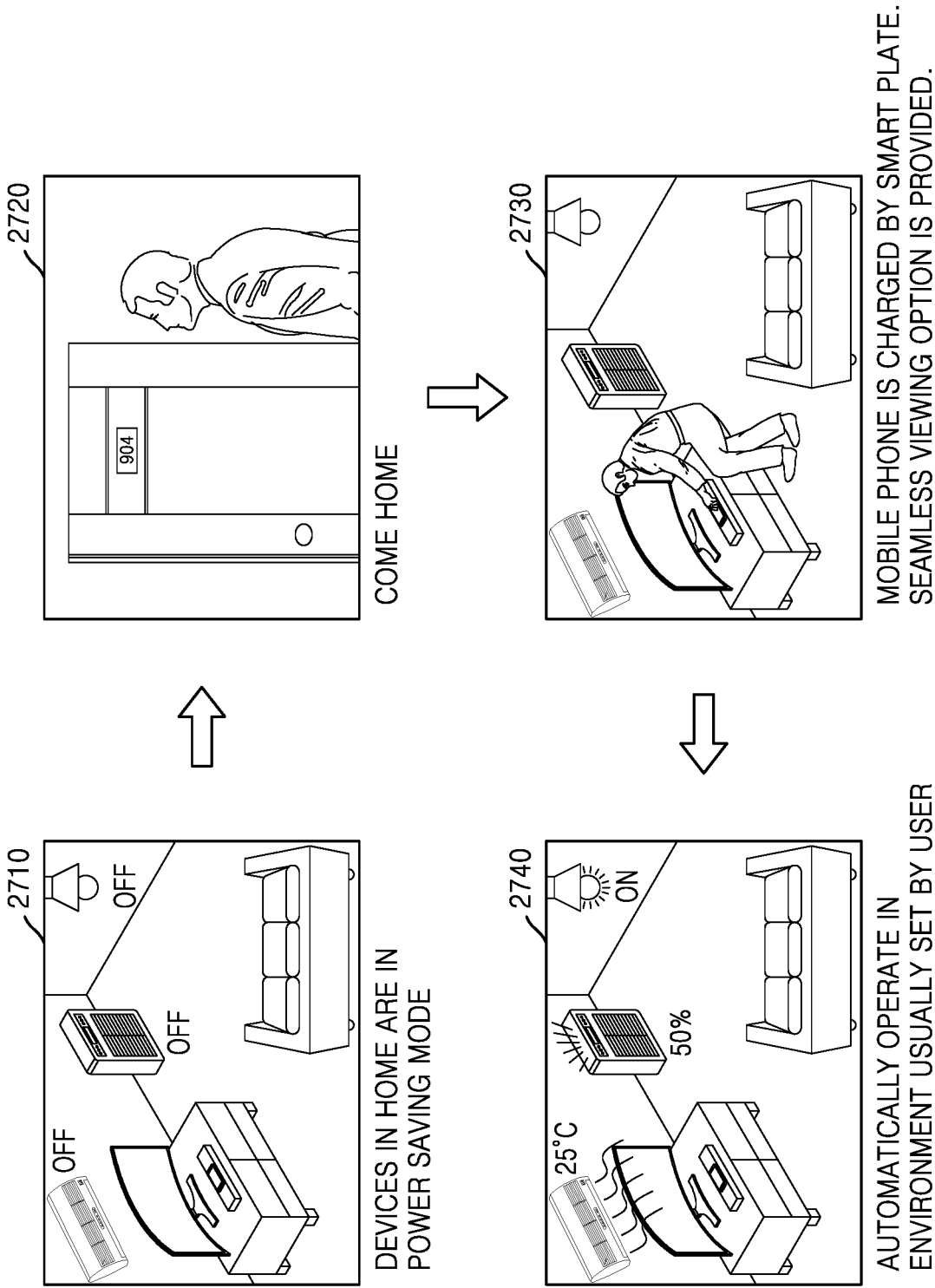
FIG. 27 is a reference diagram for explaining a usage example of an environment setting control mode, according to an embodiment.

FIG. 27 is a reference diagram for explaining a usage example of an environment setting control mode according to an embodiment.

An image 2710 of FIG. 27 shows that a plurality of devices in a room are in a power saving mode when a user is out.

An image 2720 shows that the user comes home.

An image 2730 shows that the user who comes home places his mobile phone on a smart plate. Once the mobile phone is placed on the smart plate, the smart plate may provide wireless charging to the mobile phone, and may receive environment setting control data stored in the mobile phone and may control home appliances based on the environment setting control data. The smart plate may directly control the home appliances by using the environment setting control data, or when the environment setting control data is transmitted to a TV connected to the smart plate, the TV may control the home appliances based on the environment setting control data. The smart plate may automatically perform an environment setting control function when the mobile phone is placed on the smart plate, or may perform the environment setting control function when the mobile phone provides an automatic environment setting option and the user selects the automatic environment setting option.

An image 2740 shows that when the user selects the automatic environment setting option, the smart plate or the TV controls the home appliances by using the environment setting control data stored in the mobile phone. For example, the smart plate or the TV may control an air conditioner to be set to and operate at 25°, a lighting device to be turned on, and a humidity controller to be set to and operate at 50%. Accordingly, when the user comes home after going out, he does not need to operate all indoor devices one by one and set them to desired set values. The user may set desired states of a plurality of devices in the mobile phone, and when coming home, may allow the plurality of devices to automatically and simultaneously operate in or to be set to the desired states by simply placing the mobile phone on the smart plate.

Figure 28:
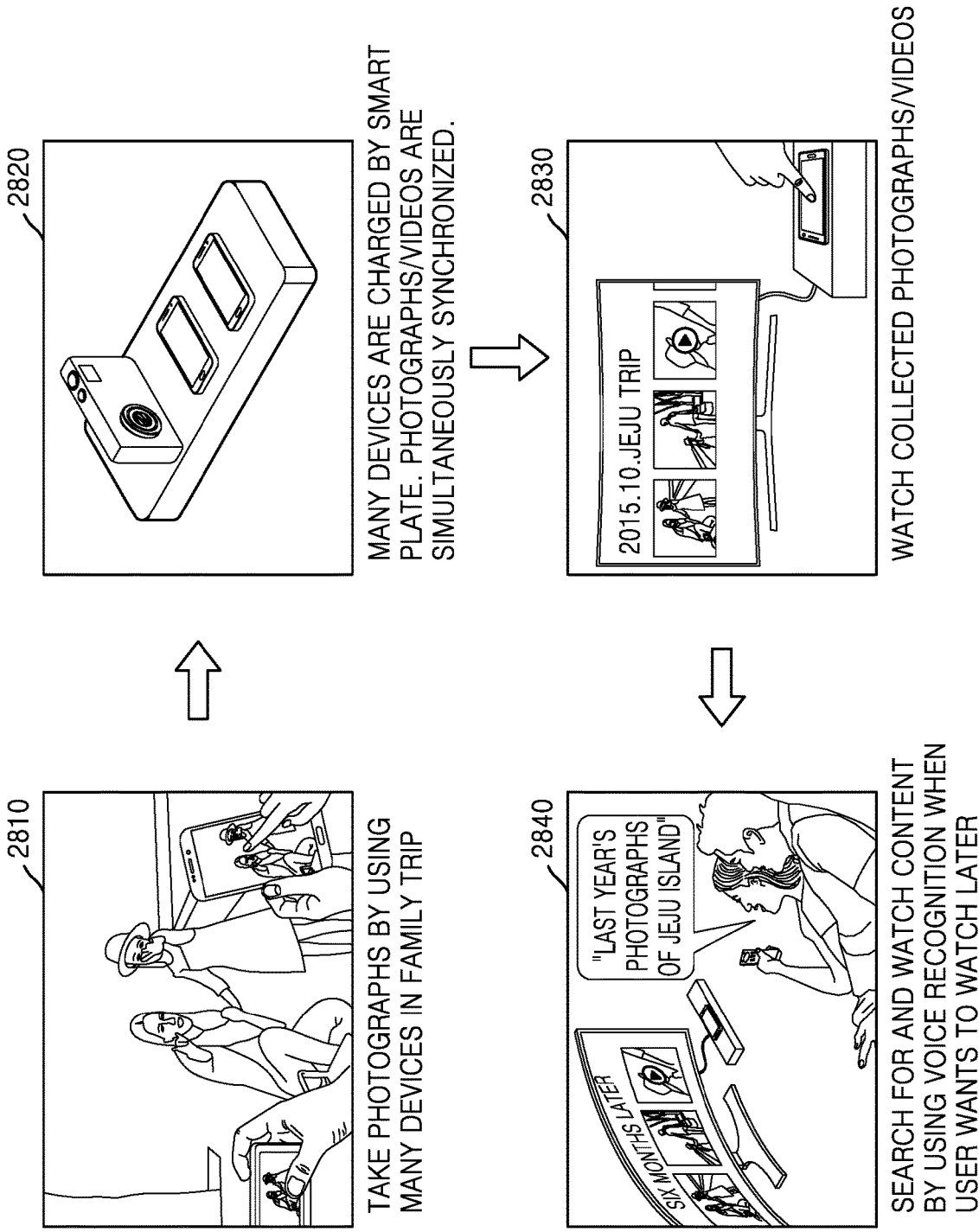
FIG. 28 is a reference diagram for explaining a usage example of a photograph synchronization mode, according to an embodiment.

FIG. 28 is a reference diagram for explaining a usage example of a photograph synchronization mode according to an embodiment.

An image 2810 of FIG. 28 shows that users take photographs by using their devices in a family trip.

An image 2820 shows that the users who come home place their devices on a smart plate. The smart plate may simultaneously charge one or more mobile devices, and thus provide wireless charging to the plurality of devices placed on the smart plate. Also, the smart plate may check whether there are photographs or video data to be synchronized in the plurality of devices placed on the smart plate, and, when there are photographs or vide data to be synchronized, may simultaneously synchronize the photographs or video data.

An image 2830 shows that the photographs or video data synchronized with the smart plate are watched on a TV connected to the smart plate. The photographs or video data synchronized from a camera, father's phone, or mother's phone placed on the smart late may be collected and stored in one storage or one folder according to the users' section, or may be stored in separate storages or folders designated for respective devices.

As smart devices have recently been distributed and used, users may obtain content such as photographs or videos any time by using their smart devices. However, due to a limited memory capacity of a smart device or in order to watch obtained photographs or videos on a larger screen, a user has to transfer obtained content to an indoor device having a large screen. In this case, it may be very inconvenient for the user to directly connect and copy photographs or video content that may be obtained several times a day to the device every time. However, when the smart plate is used, the user may complete a data synchronization operation by simply placing his/her mobile device on the smart plate, thereby improving user convenience.

An image 2840 shows that any of the users watches the photographs or video data stored in the TV or the smart plate when he/she wants to watch later. For example, a remote controller of the TV may have a voice recognition function, and when the user utters "Last year's photographs of Jeju Island" by using the remote controller, a signal obtained by recognizing the utterance may be transmitted to the TV and the TV may output the photographs or video data corresponding to the last year's photographs of Jeju Island.

FIG. 29 is a reference diagram for explaining a usage example of an account synchronization mode according to an embodiment.

An image 2910 of FIG. 29 shows that a user uses a hotel in the destination where a smart plate and a Samsung TV connected to the smart plate are provided.

An image 2920 shows that the user places his/her mobile phone on the smart plate of the hotel in the destination. The smart plate may perform account synchronization as well as providing wireless charging to the user's mobile phone placed on the smart plate. The smart plate may fetch account data of the user from the mobile phone and may transmit the account data to the Samsung TV connected to the smart plate.

An image 2930 shows that the Samsung TV connected to the smart plate receives the account data from the user's mobile phone from the smart plate and sets an environment of the Samsung TV based on the account data or uses the count data for a content service used by the user. For example, when Korean is set as language information in the account data of the mobile phone, the Samsung TV may provide content in Korean when providing the content to the user.

An image 2940 shows that due to the account synchronization using the smart plate, the user may watch over-the-top (OTT) channel/content without login. OTT is a TV service watched over the Internet, and an OTT channel may provide video content over the public Internet, instead of radio waves or cables, and refers to a channel providing any Internet-based video service.

For example, service subscription information of a specific OTT channel, that is, login information, may be included in the account data of the mobile phone received by the Samsung TV from the smart plate. When the user accesses the specific OTT channel which he/she usually uses through the Samsung TV of the hotel in the destination, the Samsung TV of the hotel in the destination may automatically access the OTT channel by using the login information of the OTT channel.

FIG. 30 is a reference diagram for explaining a usage example of an environment setting control mode according to an embodiment.

An image 3010 of FIG. 30 shows that a user uses a hotel in the destination where a smart plate and a Samsung TV connected to the smart plate are provided. Environment setting information in the hotel room is stored in the smart plate of the hotel in the destination. For example, the environment setting information may include a temperature of 25°, a humidity of 50%, and an illumination of 80%. In addition, the environment setting information may include a background music setting through audio device control, and a specific channel or specific content display through display device control.

An image 3020 shows that the user places his mobile phone on the smart plate of the hotel in the destination. The smart plate may transmit the environment setting information stored in the smart plate to the user's mobile phone, as well as providing wireless charging to the user's mobile phone placed on the smart plate. For example, when the user feels comfortable with the environment in the hotel room and wants to download the environment setting information of the hotel room, the user may receive the environment setting information stored in the smart plate by using the mobile phone through an application of the mobile phone.

An image 3030 shows that the user who comes home places his mobile phone on a smart plate in his home. Once the mobile phone is placed on the smart plate, the smart plate may receive environment setting control data stored in the mobile phone and may control home appliances based on the environment setting control data, as well as providing wireless charging to the mobile phone.

An image 3040 shows that the smart plate or a TV controls indoor devices by using the environment setting control data stored in the mobile phone. For example, the smart plate or the TV may receive the environment setting information <Temperature of 25°, Humidity of 50%, and Illumination of 80%> stored in the mobile phone, and may cause an air conditioner to be set to and operate at 25°, an illumination to be adjusted to 80%, and a humidity controller to be set to and operate at 50%. Accordingly, when the user who comes home from the hotel in the destination wants to apply the environment of the hotel in the destination to his home, he does not need to operate all indoor devices one by one and set them to desired set values. The user may conveniently apply the environment setting of the hotel in the destination to his home by simply placing the mobile phone, receiving the environment setting information from the smart plate of the hotel in the destination, on the smart plate in his home. The smart plate by which the mobile phone receives the environment setting information may be provided in any place such as a friend's home, an office, or a café as well as the hotel in the destination.

The term "module" used in various embodiments of the present disclosure may refer to, for example, a unit including one or more combinations of hardware, software, and firmware. The "module" may be interchangeably used with terms, such as "unit," "logic," "logical block," "component," or "circuit". The "module" may be a portion or a minimum unit of an integrated component. The "module" may be a portion or a minimum unit for performing one or more functions. The "module" may be implemented mechanically or electronically. For example, the "module" according to various embodiments of the present disclosure may include at least one of an application-specific integrated circuit (ASIC) chip, a field-programmable gate array (FPGA), and a programmable-logic device for performing some operations which are known or to be developed.

According to various embodiments, at least a portion of a device (e.g., modules or functions thereof) or a method (e.g., operations) according to various embodiments of the present disclosure may be implemented in the form of a programming module by instructions stored in computer-readable storage media. When the instructions are executed by at least one processor, the at least one processor may perform a function corresponding to the instructions. The computer-readable storage media may include, for example, a memory. At least a portion of the programming module may be implemented (e.g., executed) by, for example, the processor. At least a portion of the programming module may include, for example, a module, a program, a routine, sets of instructions, or a process for performing at least one function.

The computer-readable storage media may include magnetic media such as a hard disk, a floppy disk, and a magnetic tape, optical media such as a compact disc read-only memory (CD-ROM) and a digital versatile disc (DVD), magneto-optical media such as a floptical disk, and a hardware device, specially configured to store and execute program commands (e.g., a programming module), such as a read-only memory (ROM), a random-access memory (RAM), and a flash memory. Further, examples of the program commands may include a high-level language code that may be executed by a computer using an interpreter as well as a machine language code made by a compiler. In order to perform operations of various embodiments of the present disclosure, the above-described hardware device may be configured to operate as at least one software module, and vice versa.

A module or a programming module according to various embodiments of the present disclosure may include at least one of the foregoing constituent elements, may omit some constituent elements, or may further include an additional constituent element. Operations performed by a module, a programming module, or another constituent element according to various embodiments of the present disclosure may be executed with a sequential, parallel, repeated, or heuristic method. Further, some operations may be executed in different orders, may be omitted, or may add other operations.

Embodiments of the present disclosure have been described with reference to different functional units and processes for clear understanding. However, it will be obvious that functions may be appropriately distributed among the different functional units or processors as long as the uniformity of the present disclosure is maintained. For example, functions described as being performed by independent processors or controllers may be performed by the same processor or controller, and may be exchanged if necessary. As a result, the description of specific functional units should be construed as referring to appropriate means that performs the functions, not strict logical or physical structures or organs.

While the present disclosure is described with reference to some embodiments, the present disclosure is not limited to the some embodiments. The scope of the present disclosure is limited only by the claims. Also, although characteristics of the present disclosure are described only with respect to the some embodiments, it will be obvious to one of ordinary skill in the art that the above embodiments may be combined. The term 'comprising' in the claims does not exclude that other elements or operations may further exist.

Furthermore, although many units, elements, and operations are mentioned, they may be performed by one unit or processor. Also, although individual features are included in different claims, they may be combined, and although included in different claims, it does not mean that it is impossible or disadvantageous to combine the features. Also, features included only in one category from among the claims are not limited to the category, and may be applied to other category claims in an appropriate manner.

What is claimed is:

1. A wireless power transmission device comprising:
a wireless power transmitter; and
a processor configured to:
- detect whether a mobile first electronic device is in contact with the wireless power transmission device;
- based on detecting that the mobile first electronic device is in contact with the wireless power transmission device, control the wireless power transmitter to transmit wireless power to the mobile first electronic device;
- while the mobile first electronic device is detected as being in contact with the wireless power transmission device, detect whether the mobile first electronic device is currently reproducing content; and
- based on detecting that the mobile first electronic device is currently reproducing content, automatically transmit a command to an external second electronic device, which is different from the mobile first electronic device and is connected to the wireless power transmission device, for causing the content currently being reproduced by the mobile first electronic device to be seamlessly reproduced by the external second electronic device.

2. The wireless power transmission device of claim 1, wherein the processor is further configured to:
- obtain a signal indicating that the mobile first electronic device is in contact with the wireless power transmission device, from a power control message or a near-field communication signal received from the mobile first electronic device, and
- wherein the processor is configured to detect that the mobile first electronic device is in contact with the wireless power transmission device based on the signal indicating that the mobile first electronic device is in contact with the wireless power transmission device.

3. The wireless power transmission device of claim 1, wherein the processor is further configured to start a data synchronization operation with the mobile first electronic device based on detecting that the mobile first electronic device is in contact with the wireless power transmission device.

4. The wireless power transmission device of claim 3, wherein data of the data synchronization operation comprises account data or content data.

5. The wireless power transmission device of claim 1, further comprising:
an input/output port for providing a wired connection to the external second electronic device.

6. The wireless power transmission device of claim 1, further comprising:
wireless communication circuitry for providing a wireless connection to the external second electronic device.

7. The wireless power transmission device of claim 1, wherein the processor is further configured to:
- receive, from the mobile first electronic device, setting data for controlling the external second electronic device; and
- control to transmit, to the external second electronic device, a signal for controlling the external second electronic device based on the received setting data.

8. The wireless power transmission device of claim 7, wherein the external second electronic device comprises a display device.

9. A wireless power transmission device comprising:
a wireless power transmitter; and
a processor configured to:
- detect whether a mobile first electronic device is in contact with the wireless power transmission device;
- based on detecting that the mobile first electronic device is in contact with the wireless power transmission device:
  - control the wireless power transmitter to transmit wireless power to the mobile first electronic device;
  - based on a first setting of the wireless power transmission device, control to transmit, to an external second electronic device, which is different from the mobile first electronic device and is connected to the mobile first electronic device or to the wireless power transmission device, a command for the external second electronic device to output a user interface for selecting one or more functionalities; and
  - based on a second setting of the wireless power transmission device, control to automatically perform at least one of the one or more functionalities.

10. The wireless power transmission device of claim 9, wherein the one or more functionalities comprise at least one from among a function of controlling an operation with the mobile first electronic device, a function of controlling an operation with the external second electronic device, or a function of controlling an operation of at least one other external third electronic device.

11. The wireless power transmission device of claim 9, wherein the one or more functionalities comprise at least one from among a seamless content viewing function, an environment setting control function, a content synchronization function, or an account synchronization function.

12. The wireless power transmission device of claim 9, wherein the user interface comprises:
- an activation inquiry user interface for inquiring about whether to activate a functionality menu user interface that provides a functionality menu, wherein
- the functionality menu user interface is output in response to an input for selecting activation from the activation inquiry user interface.

13. A method for operating a wireless power transmission device, the method comprising:
- detecting whether a mobile first electronic device is in contact with the wireless power transmission device;
- based on detecting that the mobile first electronic device is in contact with the wireless power transmission device, transmitting wireless power to the mobile first electronic device;
- while the mobile first electronic device is detected as being in contact with the wireless power transmission device, detecting whether the mobile first electronic device is currently reproducing content; and
- based on detecting that the mobile first electronic device is currently reproducing content, automatically transmitting a command to an external second electronic device, which is different from the mobile first electronic device and is connected to the wireless power transmission device, for causing the content currently being reproduced by the mobile first electronic device to be seamlessly reproduced by the external second electronic device.

14. The method of claim 13, further comprising obtaining a signal indicating that the mobile first electronic device is in contact with the wireless power transmission device, from a power control message or a near-field communication signal received from the mobile first electronic device, wherein the mobile first electronic device is detected as being in contact with the wireless power transmission device comprises based on the signal indicating that the mobile first electronic device is in contact with the wireless power transmission device.

15. The method of claim 13, further comprising starting a data synchronization operation with the mobile first electronic device based on detecting that the mobile first electronic device is in contact with the wireless power transmission device.

16. A method for operating a wireless power transmission device, the method comprising:
   detecting whether a mobile first electronic device is in contact with the wireless power transmission device;
   based on detecting that the mobile first electronic device is in contact with the wireless power transmission device:
      controlling a wireless power transmitter of the wireless power transmission device to transmit wireless power to the mobile first electronic device;
      based on a first setting of the wireless power transmission device, transmitting, to at least one of the mobile first electronic device or an external second electronic device, a command to output a user interface for selecting one or more functionalities, wherein the external second electronic device is different from the mobile first electronic device and is connected to the mobile first electronic device or to the wireless power transmission device; and
      based on a second setting of the wireless power transmission device, control to automatically perform at least one of the one or more functionalities.

17. The method of claim 16, wherein the one or more functionalities comprise at least one from among a function of controlling an operation with the mobile first electronic device, a function of controlling an operation with the external second electronic device, or a function of controlling an operation of at least one other external third electronic device.

18. The method of claim 16, wherein the one or more functionalities comprise at least one from among a seamless content viewing function, an environment setting control function, a content synchronization function, or an account synchronization function.

19. The method of claim 16, wherein the user interface comprises:
   an activation inquiry user interface for inquiring about whether to activate a functionality menu user interface that provides a functionality menu, wherein
   the functionality menu user interface is output in response to an input for selecting activation from the activation inquiry user interface.

* * * * *